(12) United States Patent
Gutierrez et al.

(10) Patent No.: US 7,349,360 B2
(45) Date of Patent: Mar. 25, 2008

(54) AD-HOC NETWORK AND METHOD OF ROUTING COMMUNICATIONS IN A COMMUNICATION NETWORK

(75) Inventors: José A. Gutierrez, Brookfield, WI (US); Luis R. Pereira, Milwaukee, WI (US)

(73) Assignee: Gaton Corporation, Cleveland, OH (US)

( * ) Notice: Subject to any disclaimer, the term of this patent is extended or adjusted under 35 U.S.C. 154(b) by 941 days.

(21) Appl. No.: 10/441,315

(22) Filed: May 19, 2003

(65) Prior Publication Data

US 2004/0233855 A1 Nov. 25, 2004

(51) Int. Cl.
*H04J 3/08* (2006.01)

(52) U.S. Cl. .................. 370/315; 370/252; 370/401; 370/408

(58) Field of Classification Search ........... 370/395.31, 370/401, 396, 408, 395.32, 255, 229, 230, 370/230.1, 231, 235, 252, 253
See application file for complete search history.

(56) References Cited

U.S. PATENT DOCUMENTS

| | | | |
|---|---|---|---|
| 5,570,084 A | 10/1996 | Ritter et al. |
| 5,572,528 A | 11/1996 | Shuen |
| 5,604,869 A | 2/1997 | Mincher et al. |
| 5,699,176 A | 12/1997 | Cohen |
| 5,737,318 A | 4/1998 | Melnik |
| 5,757,783 A | 5/1998 | Eng et al. |
| 5,774,698 A | 6/1998 | Olnowich |
| 5,872,773 A | 2/1999 | Katzela et al. |
| 5,974,236 A | 10/1999 | Sherman |
| 5,978,364 A | 11/1999 | Melnik |
| 5,987,011 A | 11/1999 | Toh |
| 6,034,961 A | 3/2000 | Masuo et al. |
| 6,046,978 A | 4/2000 | Melnik |
| 6,115,580 A | 9/2000 | Chuprun et al. |
| 6,130,881 A | 10/2000 | Stiller et al. |
| 6,167,025 A | 12/2000 | Hsing et al. |
| 6,272,129 B1 | 8/2001 | Dynarski et al. |
| 6,349,091 B1 | 2/2002 | Li |

(Continued)

OTHER PUBLICATIONS

Johnson, David B., et al., "Dynamic Source Routing in Ad Hoc Wireless Networks", Mobile Computing, 1996, 18 pp.

(Continued)

*Primary Examiner*—Ricky Q. Ngo
*Assistant Examiner*—Gary Mui
(74) *Attorney, Agent, or Firm*—Martin J. Moran

(57) ABSTRACT

An ad-hoc low rate-wireless personal area network (LR-WPAN) includes an ad-hoc network coordinator having a first processor, a first memory, and a first communication interface; and a plurality of ad-hoc network devices. Each of the devices includes a second processor, a second memory, and a second communication interface for communication with the first communication interface of the coordinator or with the second communication interface of another one of the devices. A simple, low-cost, incremental source routing is employed. The first memory stores complete communication routes for messages from the coordinator through at least one of the devices to other devices. The second memory of each of the devices stores an identification of another device to forward a message from the second communication interface of a corresponding one of the devices toward the coordinator's first communication interface and through the second communication interface of that other device.

11 Claims, 9 Drawing Sheets

U.S. PATENT DOCUMENTS

| | | |
|---|---|---|
| 6,381,467 B1 * | 4/2002 | Hill et al. .................. 455/519 |
| 6,393,289 B1 | 5/2002 | Bunting et al. |
| 6,535,498 B1 * | 3/2003 | Larsson et al. ............. 370/338 |
| 6,775,258 B1 * | 8/2004 | van Valkenburg et al. .. 370/338 |
| 6,876,643 B1 * | 4/2005 | Aggarwal et al. .......... 370/338 |
| 7,006,453 B1 * | 2/2006 | Ahmed et al. .............. 370/255 |
| 7,035,207 B2 * | 4/2006 | Winter et al. ............... 370/225 |

OTHER PUBLICATIONS

Gutierrez, Jose A., "Last Meter Information Connectivity Beyond Bluetooth", Eaton Corporation, Oct. 1, 2001, 12 pp.

Gutierrez, Jose A. et al., "Bluetooth & Beyond: Wireless Networks for Industrial Applications", Eaton Corporation, Sep. 12, 2001, 11 pp.

Gutierrez, Jose A. et al., "IEEE 802. 15.4: Developing Standard for Low-Power Low-Cost Wireless Personal Area Networks", IEEE Network, Sep./Oct. 2001, pp. 2-9.

Misra, Padmini, "Routing Protocols for Ad Hoc Mobile Wireless Networks", ftp://ftp.netlab.ohio-state.edu/pub/jain/courses/cis788-99/adhoc_routing/index.html, Aug. 5, 2002, 17 pp.

Johnson, David B., "Dynamic Source Routing", Ad Hoc Wireless Networking Using Dynamic Source Routing, 1997, 1 p.

Xiaoyan Hong, et al. "Scalable Routing Protocols for Mobile Ad Hoc Networks", IEEE Network, Jul./Aug. 2002, pp. 11-21.

"Ad hoc On-Demand Distance Vector Routing", http://moment.cs.ucsb.edu/AODV/aodv.html, Apr. 21, 2003, 5 pp.

\* cited by examiner

AD-HOC NETWORK AND METHOD OF ROUTING COMMUNICATIONS IN A COMMUNICATION NETWORK

BACKGROUND OF THE INVENTION

1. Field of the Invention

This invention relates generally to communication networks and, more particularly, to routing algorithms for ad-hoc networks, such as, for example, a multi-hop or a low rate-wireless personal area network (LR-WPAN). The invention also relates to methods of routing communications in a communication network, such as an ad-hoc network.

2. Background Information

Wireless networks are an emerging new technology, which allows users to access information and services electronically, regardless of their geographic position. Wireless networks may be classified in two types: (1) infra-structured networks; and (2) infra-structureless (or ad-hoc) networks. Every ad-hoc network is infra-structureless, but the opposite is not true. A main characteristic of ad-hoc networks is self-configuration.

An infra-structured network includes a communication network with fixed and wired gateways. A mobile unit or host communicates with a bridge in the network (called a base station) within its communication radius. The mobile host can move geographically while it is communicating. When it goes out of range of one base station, it connects with a new base station and starts communicating through it. This is called handoff. In this approach, the base stations are fixed.

In contrast to infra-structured networks, all nodes in ad-hoc networks are potentially mobile and can be connected dynamically in an arbitrary manner. All nodes of these networks behave as routers and take part in discovery and maintenance of routes to other nodes in the network. For example, ad-hoc networks are very useful in emergency search-and-rescue operations, meetings or conventions in which persons wish to quickly share information, and in data acquisition operations in inhospitable terrains.

An ad-hoc mobile communication network comprises a plurality of mobile hosts, each of which is able to communicate with its neighboring mobile hosts, which are a single hop away. In such a network, each mobile host acts as a router forwarding packets of information from one mobile host to another.

In an ad-hoc mobile communication network, the mobile hosts communicate with each other over a wireless media without any infra-structured (or wired) network component support. Accordingly, one of the most important features of any routing method or protocol for an ad-hoc mobile communication network is the ability to adapt well to link changes, namely changes in the interconnectivity between mobile hosts due to mobile hosts' migrations. Ideally, mobile hosts should not spend most of their time updating and computing routes in sympathy with other mobile hosts' movements. However, conventional distributed routing schemes attempt to maintain consistent routing information by performing periodic link and topology updates. These updates are undesirable because of the frequent link changes occurring in ad-hoc mobile communication networks, which can result in an enormous number of transmissions over the wireless media to propagate and update routes. This is highly impractical, very inefficient and results in low data throughput in an environment where bandwidth and battery power are scarce resources.

Several ad-hoc mobile routing schemes have evolved over the past few years. Most of these schemes are based on either broadcast or point-to-point routing using either the connectionless or connection-oriented packed forwarding approach. Routing protocols for ad-hoc networks can be divided into two categories: (1) table-driven; and; (2) on-demand. In a table-driven routing protocol, all up-to-date routes are maintained in every node. In an on-demand routing protocol, the routes are only created as and when required. When a source wants to send to a destination, it invokes a route discovery mechanism to find the path to the destination. The route remains valid until the destination is reachable or until the route is no longer needed.

One type of on-demand ad-hoc routing protocol is Dynamic Source Routing (DSR). A conventional DSR network enables communications between any devices in such network by discovering communication routes to other devices in the network. See, for example, Johnson et al., "Dynamic Source Routing in Ad Hoc Wireless Networks", Mobile Computing, 1996. Dynamic Source Routing for mobile communication networks avoids periodic route advertisements because route caches are used to store source routes that a mobile host has learned over time. A combination of point-to-point and broadcast routing using the connection-oriented packet forwarding approach is used. Routes are source-initiated and discovered via a route discovery protocol. With source routing, the sender explicitly lists the route in each packet's header, so that the next-hop nodes are identified as the packet travels towards the destination. Cached route information is used and accurate updates of these route caches are essential, otherwise routing loops can occur. Since the sender has to be notified each time a route is truncated, the route maintenance phase does not support fast route reconstruction. See, also, U.S. Pat. Nos. 6,167,025; 6,034,961; and 5,987,011.

The DSR protocol appends a complete list of addresses from one peer device to another peer device for communications. That is, each device in a DSR network knows the entire path to another device, although this stored path may dynamically change.

The two major phases of the DSR protocol are: (1) route discovery; and (2) route maintenance. When a source node wants to send a packet to a destination node, it looks up its route cache to determine if it already contains a route to the destination. If it finds that an un-expired route to the destination exists, then it uses this route to send the packet. However, if the source node does not have such a route, then it initiates the route discovery process by broadcasting a route request packet. The route request packet contains the address of the source and the destination, and a unique identification number. The route request packet is sent from the source node to the destination through intermediate nodes on several different paths. Each intermediate node checks whether it knows of a route to the destination. If it does not, it appends its address to the route record of the packet and forwards the packet to its neighbors. To limit the number of route requests propagated, a node processes the route request packet only if it has not already seen the packet and its address is not present in the route record of the packet.

A route reply is generated when either the destination or an intermediate node with current information about the destination receives the route request packet. A route request packet reaching such a node already contains, in its route record, the sequence of hops taken from the source to this node. As the route request packet propagates through the network, a route record is formed. If the route reply is generated by the destination, then it places the route record from the route request packet into the route reply packet. On the other hand, if the node generating the route reply is an intermediate node, then it appends its cache route to destination to the route record of the route request packet and puts that into the route reply packet. To send the route reply packet, the responding node must have a route to the source. If it has a route to the source in its route cache, it can use that route. The reverse of route record can be used if symmetric links are supported. In case symmetric links are not supported, the node can initiate route discovery to source and piggyback the route reply on this new route request.

The DSR protocol uses two types of packets for route maintenance: (1) a route error packet; and (2) acknowledgements. When a node encounters a fatal transmission problem at its data link layer, it generates a route error packet. When a node receives a route error packet, it removes a hop-in-error from its route cache. All routes that contain the hop-in-error are truncated at that point. Acknowledgement packets are used to verify the correct operation of the route links. This also includes passive acknowledgements in which a node hears the next hop forwarding the packet along the route.

A DSR algorithm, which is employed in ad-hoc networking communication mobile networks, is relatively very simple, albeit highly inefficient. This is because redundant information is passed along several paths, thereby wasting communication bandwidth and battery power of the nodes. In addition, DSR requires that the information paths be bidirectional, in order that they can carry both route request packets and route replies. Still further, DSR requires that the cache in each node store the preferred communication routes for both upstream and downstream communications. Hence, each device in the DSR network must be capable of storing within the entire route to a destination, regardless how many devices the message must pass through.

Although DSR is one of the simplest algorithms, it has the disadvantage of using relatively very long "packets". Anything that uses "Source Routing" has this disadvantage.

There exists the need to simplify the installation of communication networks.

There is the need to simplify the deployment of ad-hoc communication networks.

There is room for improvement in wired and wireless communication networks and systems.

There is also room for improvement in ad-hoc networks and in methods of routing communications in ad-hoc networks.

SUMMARY OF THE INVENTION

These needs and others are met by the present invention, which provides improvements in source routing by employing incremental source routing. In other words, the address field within a packet increases (or decreases) hop after hop. Hence, this requires minimal resources (e.g., RAM and ROM) and the application does not generate a lot of traffic in terms of too many packets generated per unit of time. This is advantageous when employed, for example, with Low-Rate WPAN technology.

For downstream communications from an ad-hoc network coordinator, a plurality of complete communication routes are stored for ad-hoc network devices for messages from the ad-hoc network coordinator through at least one of those ad-hoc network devices to a corresponding ad-hoc network device. Also, for upstream communications to the ad-hoc network coordinator, for each of the ad-hoc network devices, an identification of another one of the ad-hoc network devices is stored to forward a message from the communication interface of a corresponding one of the ad-hoc network devices toward the communication interface of the ad-hoc network coordinator and through the communication interface of the other one of the ad-hoc network devices.

The ad-hoc network in accordance with the invention employs a network topology wherein a network controller (NC) controls a web of network devices (NDs), which may be connected directly to the NC or indirectly to the NC via one or more NDs. The source routing is dynamic, in that the preferred routing is constantly changeable based on operating conditions. However, unlike full source routing protocols (e.g., DSR), only the NC, which has relatively higher processing power and memory than the NDs connected thereto, includes all of the preferred routes between the NDs. In contrast, the NDs are relatively low power, low memory (e.g., relatively low or simple processing and resources) devices that have a simpler program (less complex) than the NC. Instead, the NDs, upon initialization, engage in a neighbor discovery process, in which the "best" multi-hop neighbor is discovered. In this manner, the NC knows the entire roadmap of the ad-hoc network, while each of the NDs only knows enough to ask its "best" neighbor to pass the information along to its "best" neighbor, and so on, until the ultimate destination is reached. Accordingly, this ad-hoc network enables relatively efficient, low power, low cost communication in systems, such as building automation, that would, otherwise, be cost prohibitive if only full source routing (e.g., standard DSR) networks were employed.

As one aspect of the invention, an ad-hoc network comprises: an ad-hoc network coordinator comprising: a first processor, a first memory, and a first communication interface; and a plurality of ad-hoc network devices, each of the ad-hoc network devices comprising: a second processor, a second memory, and a second communication interface for communication with the first communication interface of the ad-hoc network coordinator or with the second communication interface of another one of the ad-hoc network devices, wherein the first memory stores for at least some of the ad-hoc network devices a complete communication route for messages from the ad-hoc network coordinator through at least one of the ad-hoc network devices to a corresponding one of the at least some of the ad-hoc network devices, and wherein the second memory of each of the ad-hoc network devices stores an identification of another one of the ad-hoc network devices to forward a message from the second communication interface of a corresponding one of the ad-hoc network devices toward the first communication interface of the ad-hoc network coordinator and through the second communication interface of the another one of the ad-hoc network devices.

The second processor may include means for providing the identification of another one of the ad-hoc network devices to forward a message based upon quality information associated with communications between the second communication interface of the corresponding one of the ad-hoc network devices and the second communication interface of the another one of the ad-hoc network devices.

The quality information may be positively correlated with a quality value associated with a communication link between the second communication interface of the corresponding one of the ad-hoc network devices and the second communication interface of the another one of the ad-hoc network devices, and may be negatively correlated with a count of hops from the second communication interface of the another one of the ad-hoc network devices to the ad-hoc network coordinator.

The ad-hoc network devices may include a first ad-hoc network device, a second ad-hoc network device and a third ad-hoc network device. The message from the second communication interface of a corresponding one of the ad-hoc network devices may be forwarded in a first message from the first ad-hoc network device to the second ad-hoc network device, and in a second message from the second ad-hoc network device to the third ad-hoc network device, and in a third message from the third ad-hoc network device to the ad-hoc network coordinator. The means for providing of the second processor of the first ad-hoc network device may provide the identification of the second ad-hoc network device. The means for providing of the second processor of the second ad-hoc network device may provide the identification of the third ad-hoc network device. The means for providing of the second processor of the third ad-hoc network device may provide the identification of the ad-hoc network coordinator.

A first partial communication route to the ad-hoc network coordinator may be defined by the first ad-hoc network device and the second ad-hoc network device and may be stored in the first message. A second partial communication route to the ad-hoc network coordinator may be defined by the first ad-hoc network device, the second ad-hoc network device and the third ad-hoc network device, and may be stored in the second message. A complete communication route between the first ad-hoc network device and the ad-hoc network coordinator may be defined by the first ad-hoc network device, the second ad-hoc network device, the third ad-hoc network device and the ad-hoc network coordinator, and may be stored in the third message.

The first processor may employ a full source routing protocol for communication of a plurality of messages from the first communication interface of the ad-hoc network coordinator to the second communication interface of the ad-hoc network devices. The ad-hoc network devices may include a first ad-hoc network device, a second ad-hoc network device and a third ad-hoc network device. One of the messages may be forwarded in a first message from the ad-hoc network coordinator to the first ad-hoc network device, and in a second message from the first ad-hoc network device to the second ad-hoc network device, and in a third message from the second ad-hoc network device to the third ad-hoc network device. The complete communication route may be defined by the ad-hoc network coordinator, the first ad-hoc network device, the second ad-hoc network device and the third ad-hoc network device, and may be stored in each of the first, second and third messages.

The ad-hoc network devices may include a first ad-hoc network device, a second ad-hoc network device and a third ad-hoc network device. One of the messages may be forwarded in a first message from the ad-hoc network coordinator to the first ad-hoc network device, and in a second message from the first ad-hoc network device to the second ad-hoc network device, and in a third message from the second ad-hoc network device to the third ad-hoc network device. The complete communication route may be defined by the ad-hoc network coordinator, the first ad-hoc network device, the second ad-hoc network device and the third ad-hoc network device, and may be stored in the first message. A first partial communication route may be defined by the second ad-hoc network device and the third ad-hoc network device, and may be stored in the second message. A second partial communication route may be defined by the third ad-hoc network device, and may be stored in the third message.

As another aspect of the invention, a method of routing communications in an ad-hoc network comprises: employing an ad-hoc network coordinator including a first communication interface; employing a plurality of ad-hoc network devices; employing with each of the ad-hoc network devices a second communication interface for communication with the first communication interface of the ad-hoc network coordinator or with the second communication interface of another one of the ad-hoc network devices; storing a plurality of complete communication routes for at least some of the ad-hoc network devices for messages from the ad-hoc network coordinator through at least one of the ad-hoc network devices to a corresponding one of the at least some of the ad-hoc network devices; and for each of the ad-hoc network devices, storing an identification of another one of the ad-hoc network devices to forward a message from the second communication interface of a corresponding one of the ad-hoc network devices toward the first communication interface of the ad-hoc network coordinator and through the second communication interface of the another one of the ad-hoc network devices.

As another aspect of the invention, a method of routing communications in a communication network comprises: employing a network coordinator including a first communication interface; employing a plurality of network devices; employing with each of the network devices a second communication interface for communication with the first communication interface of the network coordinator or with the second communication interface of another one of the network devices; storing a plurality of complete communication routes for at least some of the network devices for messages from the network coordinator through at least one of the network devices to a corresponding one of the at least some of the network devices; and for each of the network devices, storing an identification of another one of the network devices to forward a message from the second communication interface of a corresponding one of the network devices toward the first communication interface of the network coordinator and through the second communication interface of the another one of the network devices.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
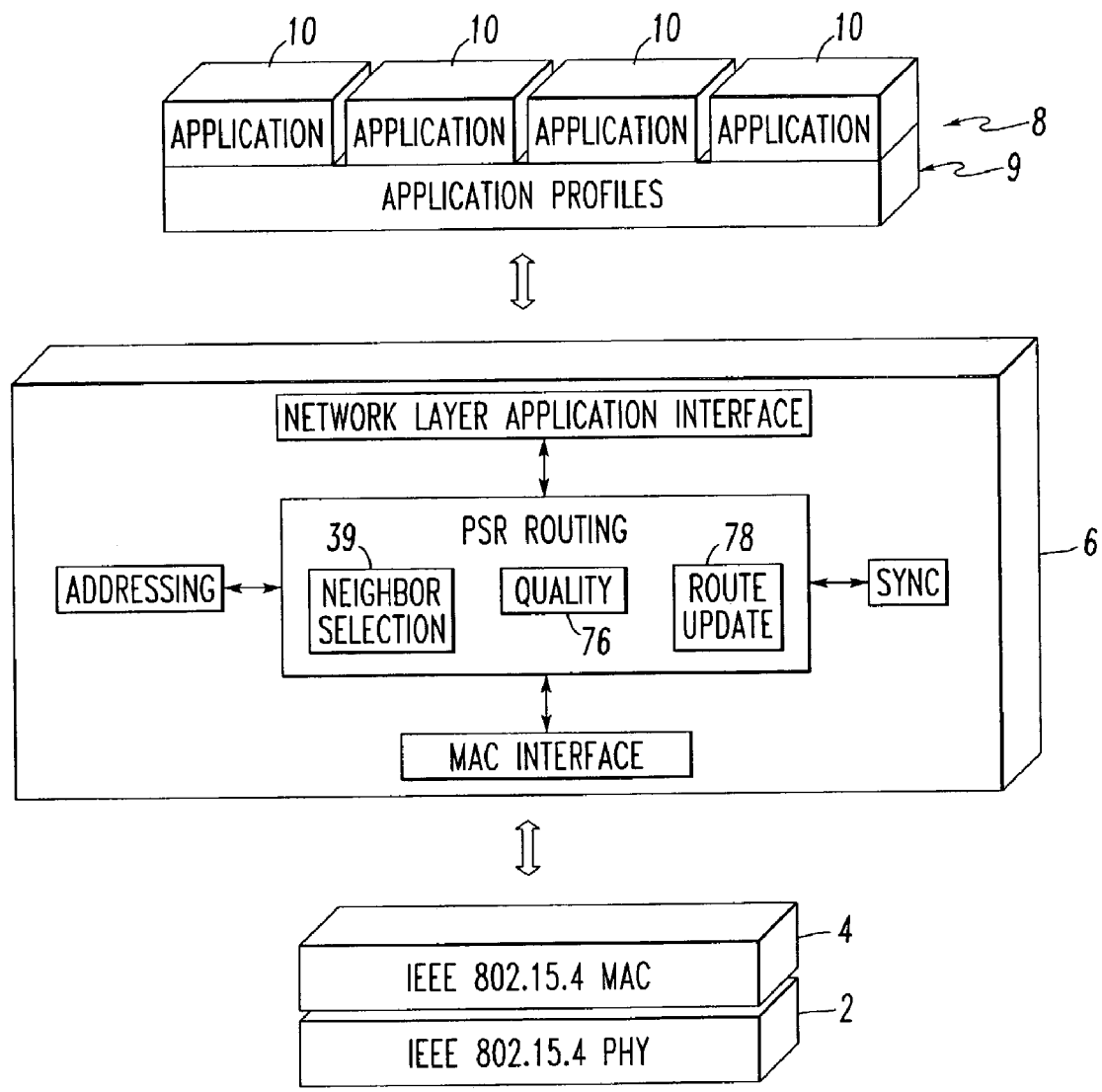
FIG. 1 is a block diagram showing a four-layer communication model including a physical (PHY) layer, a MAC layer, a network layer including a PSR algorithm and an application layer in accordance with the present invention.

As employed herein, the term "wireless" shall expressly include, but not be limited to, radio frequency, infrared, wireless area networks, IEEE 802.11 (e.g., 802.11a; 802.11b; 802.11g), IEEE 802.15 (e.g., 802.15.1; 802.15.3, 802.15.4), other wireless communication standards, DECT, PWT, pager, PCS, Wi-Fi, Bluetooth™, and cellular.

As employed herein, the term "portable communicating device" shall expressly include, but not be limited to, any portable communicating device having a wireless communication port (e.g., a handheld device; a handheld personal computer (PC); a portable or laptop PC; a Personal Digital Assistant (PDA); a mobile or cellular telephone; a wireless Internet device; a protocol-enabled telephone; a portable wireless device).

As employed herein, the term "network coordinator" (NC) shall expressly include, but not be limited to, any communicating device, which operates as the central controller in an ad-hoc communication network.

As employed herein, the term "network device" (ND) shall expressly include, but not be limited to, any communicating device (e.g., a portable communicating device; a fixed communicating device, such as, for example, switches, motion sensors or temperature sensors as employed in a wirelessly enabled sensor network), which participates in an ad-hoc communication network, and which is not a central controller.

As employed herein, the term "node" includes NDs and NCs.

For convenience of disclosure, the following acronyms are employed herein:

| | |
|---|---|
| ASN: | application sequence number (or AppSeqNr) |
| MAC: | medium access layer |
| NLME: | network layer management entity |
| NPDU: | network protocol data unit |
| NWK: | network layer |
| PAN-ID: | personal area network identifier |
| PHY: | physical layer |
| PIB: | pan information base |
| PSR: | proactive source routing |
| RSSI: | received signal strength indication |

As employed herein, "abstract syntax" means a representation of data (e.g., typically, a message passing over a communications link or a program being compiled), which representation is independent of machine-oriented structures and encoding and, also, is independent of the physical representation of the data.

As employed herein, "centralized routing" is a routing system in which a central system is responsible for telling other nodes which routes to use.

As employed herein, a "graph" is a diagram or other representation consisting of a finite set of nodes and inter-node connections (i.e., edges), which can be used for representing network connections.

As employed herein, "localized routing" is a routing system in which each node decides on the basis of locally available information, which routes to use.

As employed herein, "loop free" is a routing algorithm property, which guarantees that a message routed in a network will either be delivered to its final destination or be discarded in a finite amount of time.

As employed herein, "connected network device" is a network device whose participation in an ad-hoc communication network was accepted by the network coordinator.

As employed herein, "network topology" is a definition of the logical arrangement and interconnection pattern of nodes in a communication network.

As employed herein, "petitioner network device" is a network device waiting for a confirmation message from the network coordinator, which accepts it into the ad-hoc communication network.

As employed herein, "primitive" is a definition of service provided by a layer to the layer immediately above it. Either one of those layers (the upper layer or the lower layer) may initiate primitives.

As employed herein, "routing" is the function of finding a suitable path for a message to take from one node to its final destination.

As employed herein, "transfer syntax" is the actual representation of data as it is transmitted over an ad-hoc communication network (as opposed to abstract syntax).

As employed herein, the term "mains-powered" refers to any ND, which has continuous power capabilities (e.g., powered from an AC outlet or AC receptacle or AC power source; AC/DC powered devices; rechargeable battery powered devices; other rechargeable devices), but excluding non-rechargeable battery powered devices.

Figure 3:
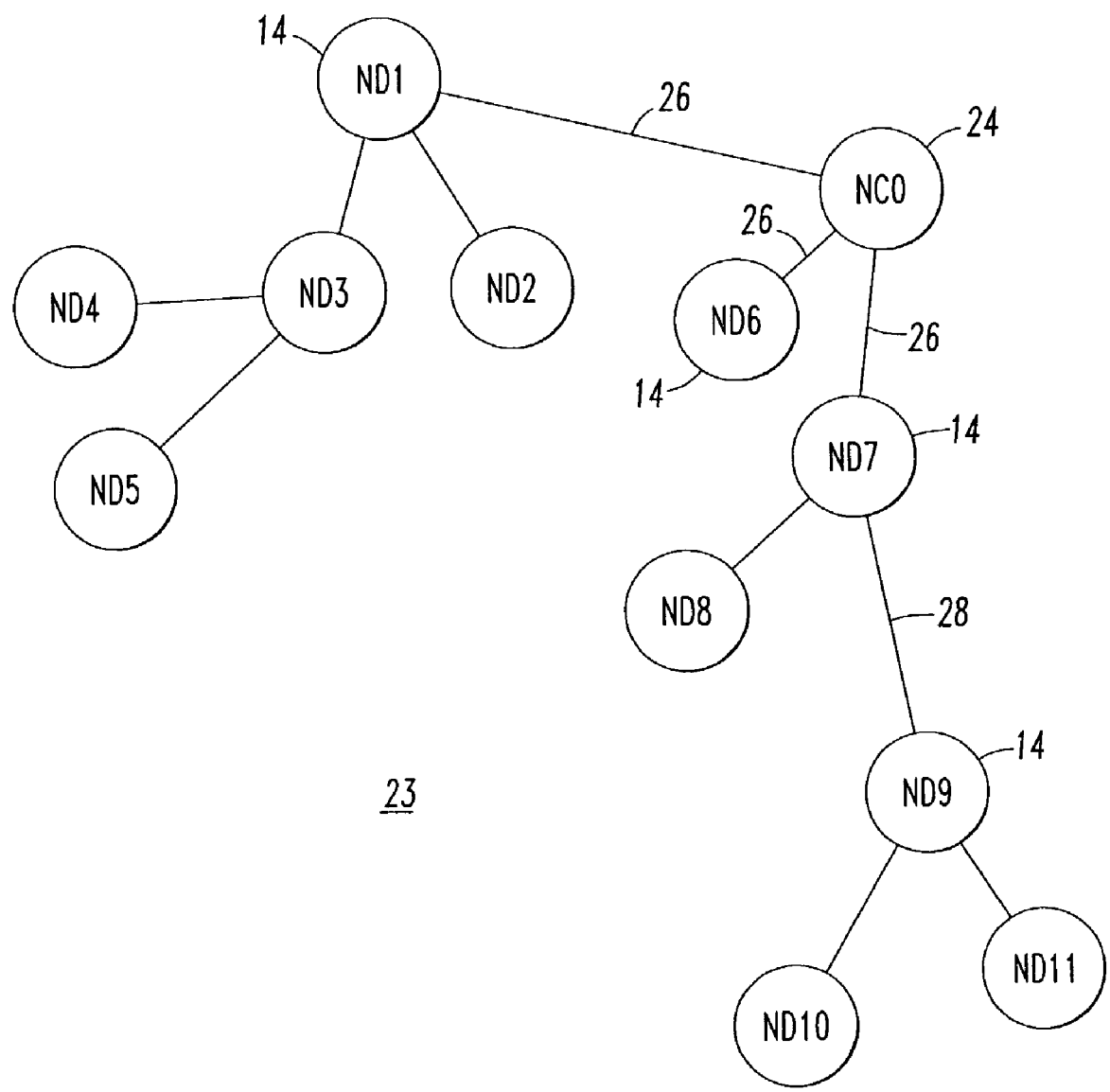
FIG. 3 is a block diagram of the topology of a PSR-based ad-hoc communication network in accordance with the present invention.
Figure 7:
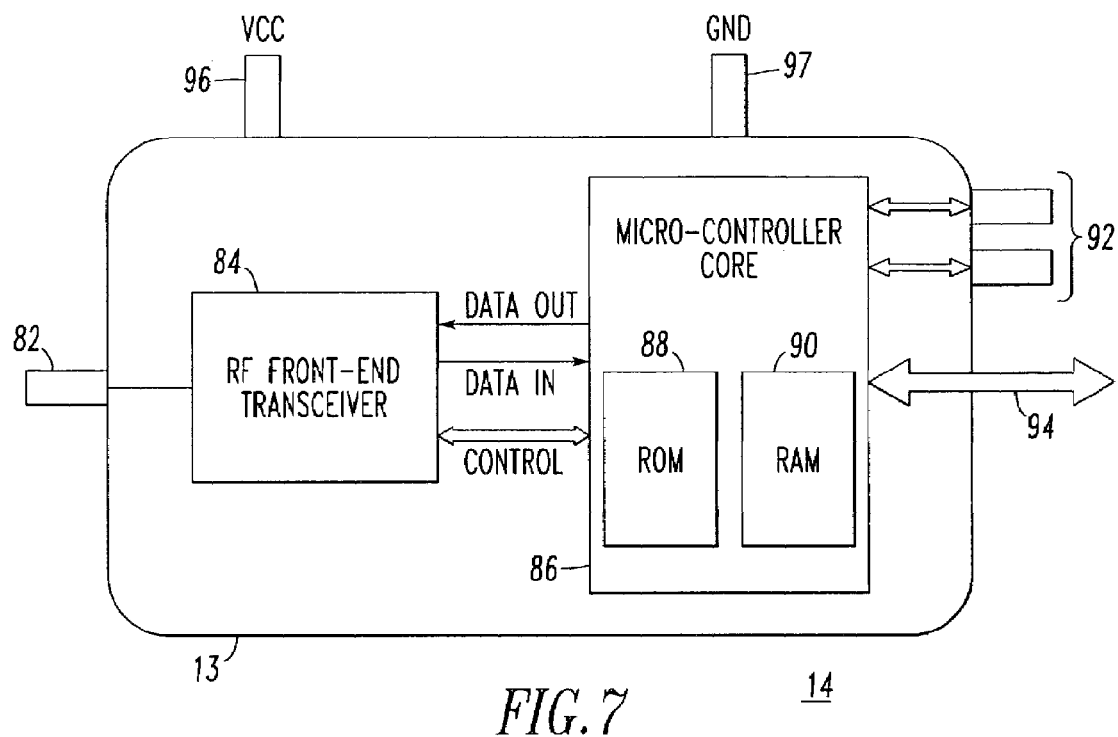
FIG. 7 is a block diagram of the network device (ND) of FIG. 3 including an antenna port, RF front-end transceiver, micro-controller core having ROM and RAM, programming port, and sensor bus.

Referring to FIG. 1, a four-layer communication model includes a physical (PHY) layer 2, a MAC layer 4, a network layer 6, and an application layer 8 having an application profile layer 9 and plurality of applications 10. In accordance with the invention, a Proactive Source Routing (PSR) protocol or algorithm 12 is implemented in the network layer 6 of an LR-WPAN transceiver 13 (FIG. 7) of plural network NDs 14 (FIGS. 3 and 7). As shown in FIG. 1, the LR-WPAN network layer 6 for LR-WPAN systems is designed to sit on top of the MAC layer 4 (e.g., IEEE 802.15.4 MAC) and the physical (PHY) layer 2 (e.g., IEEE 802.15.4), and below the application layer 8. Although examples of these layers are disclosed, a wide range of different layers may be employed. As employed hereinafter, general references to the application layer 8 refer, in particular, to its application profile layer 9.

For example, the seven-layer ISO/OSI standard may be employed. This may include suitable upper layers (e.g., Application layer and application profile layer, including Presentation sublayer, Session sublayer and Transport sublayer), Network layer and DLC (e.g., MAC and LLC sublayers) layer logic for the corresponding PHY layer of interest, such as layer 2.

Figure 2:
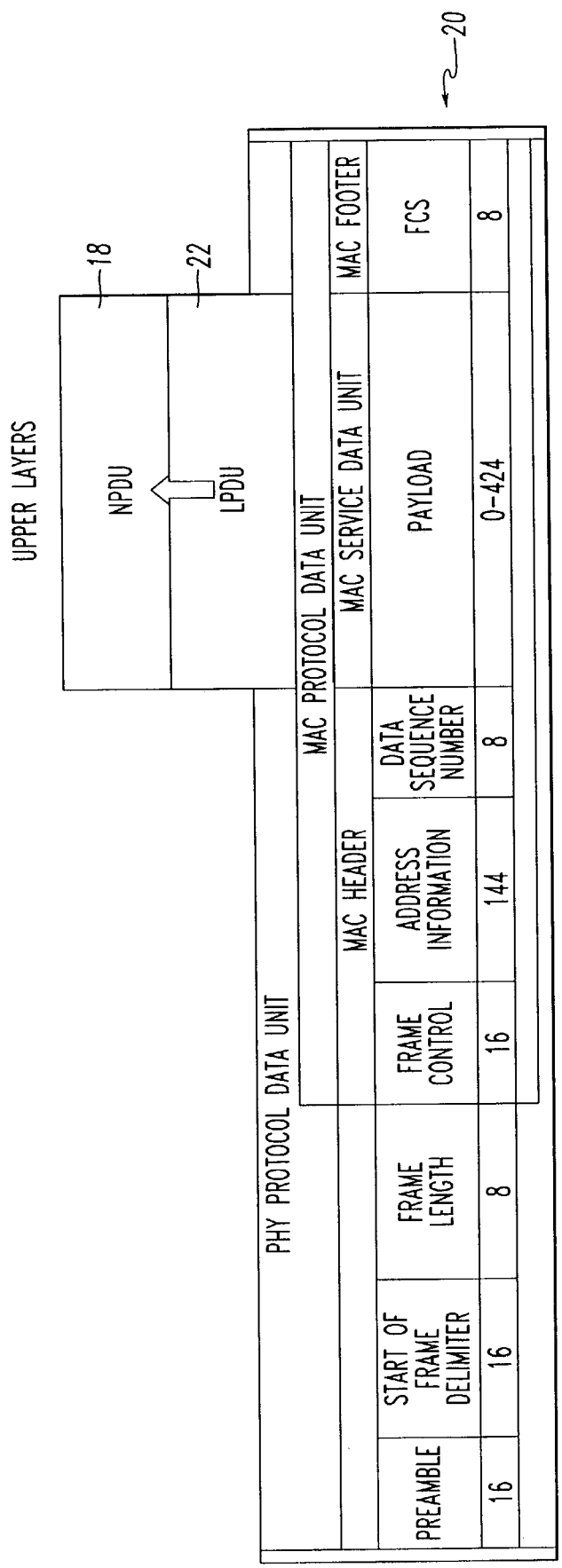
FIG. 2 is a diagram showing Network Protocol Data Unit (NPDU) mapping within the PHY Protocol Data Unit (PPDU).

Referring to FIG. 2, the Network Protocol Data Unit (NPDU) 18 mapping within the PHY Protocol Data Unit (PPDU) 20 is shown. The 802.15.4 MAC layer 4 of FIG. 1 does all the LLC functions. In other words, there is a one-to-one mapping between the NPDU 18 and the LLC Protocol Data Unit (LPDU) 22, which is equivalent of saying that the data link functionality is contained within what IEEE 802.15.4 calls the MAC layer 4. This arrangement is common for wireless networking protocols for Wireless Personal Area Networks. Although four layers are disclosed, a wide range of layer counts may be employed. In this example, the conventional 7-layer ISO model is reduced to only 4 layers.

FIG. 3 shows an example of the topology of a PSR-based ad-hoc communication network 23, which includes a single NC (NC0) 24 and eleven NDs (ND1-ND11) 14. Three one-hop NDs (ND1, ND6 and ND7) 14 are directly connected to the NC 24 by node links 26. Other NDs 14 (such as ND9) are indirectly connected to the NC 24 through one or more node links, such as 28, which directly or indirectly connect to one of the three one-hop NDs 14 (such as ND7). Although eleven NDs are shown, one or more fixed or mobile NDs may be employed. Also, although wireless networks are disclosed, the invention is applicable to "wired" networks.

Referring to FIGS. 1 and 3, the network layer 6 determines how messages are routed within the ad-hoc communication network 23 (or network 23). This network layer 6 provides its upper layer (i.e., the application layer 8) with independence from routing and relay considerations, since all relay functions are operated within such network layer. The basic service of the network layer 6 is to provide the transparent transfer of data messages between the applications 10 (or transport entities if they are defined) running in the network 23. The network layer 6 contains functions to mask the differences in the characteristics of the nodes (e.g., NDs 14 and NC 24) into a consistent network service. This means that the end-to-end service is made transparent to the upper application layer 8.

The network layer 6 makes certain assumptions about the lower layers 2,4, in order to provide network functions in reliable manner. These assumptions include: (1) topology: links, such as 26, 28, are symmetrical (i.e., links are bi-directional, with the RF output power and sensitivity of each node being the same; (2) topological change rate: the rate of topological network changes is relatively low in comparison to the network convergence time; (3) sequence preservation: the MAC layer 4 is not required to process messages in the same order that they are generated/received; (4) flow control: messages are not delivered faster than the receiver can deal with them; at least one packet at a time can be processed; (5) freedom from error: the MAC layer 4 delivers error-free messages; (6) connection establishment: the MAC layer 4 offers a connectionless mode of service; (7) expedited data: there are no assumptions about the capability of the MAC layer 4 to transfer data with priority; and (8) security: there are no assumptions about the capability of the MAC layer 4 to offer authentication, confidentiality, integrity and non-repudiation data services.

The Proactive Source Routing (PSR) algorithm 12 of FIG. 1 is a hybrid adaptive routing mechanism for an ad-hoc communication network, such as 23 of FIG. 3. The PSR algorithm 12 is based on a reactive methodology called source routing. The PSR protocol behaves in a hybrid manner since it is proactive in discovering its neighbors (i.e., NDs 14 within its radius of influence or at a single hop distance), and reactive in the discovery of routes toward the main node (i.e., NC 24) that oversees the network setup and maintenance.

The PSR algorithm 12 has the following fundamental characteristics: (1) point-to-multipoint: in this topology, there is the main node (i.e., NC 24), which controls communications with all of the other nodes (i.e., other NDs 14) in the network 23; all of the signals converge at the NC 24 for collection, retransmission or processing; (2) self-organizing: network formation starts in an autonomous manner as soon as the NDs 14 are turned on; no user-intervention is required; (3) adaptive: the routes chosen are adapted to reflect changes in the traffic pattern, link quality and network topology; (4) hybrid routing scheme: a centralized routing scheme for communications from the NC 24 toward any of the NDs 14 in the network 23, and a localized routing scheme for communications from any ND 14 toward the NC 24; (5) loop-free: based on source routing; (6) low complexity: complexity in time and space can be shown to be linear (i.e., $O(n)$), in order that there is minimal memory usage and minimal processing; and (7) effective use of available bandwidth: minimal use of control messages.

The set of topologies, which are supported by the PSR algorithm 12, follow the below characteristics of the PSR node types, the responsibilities of the NC 24, the responsibilities of the ND 14, and topological rules. First, the PSR algorithm 12 supports two types of nodes in the PSR-based ad-hoc communication network 23: (1) the Network Coordinator (NC) 24; and (2) the Network Devices (NDs) 14. As shown in the example of FIG. 3, there is only one active NC 24 per network 23, and all remaining nodes for a particular network are the NDs 14.

The responsibilities of the NC 24 include: (1) defining the PAN-ID of the network 23; (2) network formation and maintenance: accepting or rejecting new NDs 14 wanting to join the network 23 and keeping track of them; (3) administration of network addresses; (4) maintaining statistics and routing information about all nodes connected to the network 23 (i.e., the NC 24 most typically has more memory than any other node); (5) determining and instructing all nodes about routing changes; (6) serving as a point of access to any foreign devices (not shown) to the network 23; (7) relaying messages between nodes; and (8) authorizing direct routing between two NDs 14.

The responsibilities of the NDs 14 include: (1) relaying messages to and from the NC 24; and (2) being the source and sink of all network traffic.

The topological rules for the PSR algorithm 12 include: (1) one ND 14 can be linked with the NC 24 and/or with one or several NDs 14 (except for the one ND itself); and (2) the graph associated with the network 23 is connected (i.e., it is possible to find a path for each pair of nodes in such network).

The ad-hoc communication network, such as 23, is formed and maintained by employing the following principles: (1) only when the NC 24 is activated and functional it is possible to form a network, such as 23; (2) the NDs 14 cannot form networks and, instead, may try to join a particular network; (3) the NC 24 has the power to accept or deny any ND 14 wanting to connect to the network 23; (4) any new NDs 14 will try to connect to the network 23 either by talking directly with the NC 24 or by using only connected NDs 14 as intermediaries; (5) no ND 14 can transfer data until is connected; and (6) any ND 14, which is disconnected from the network 23, tries to reconnect to the network 23 as soon as it is permitted.

Figure 4A:
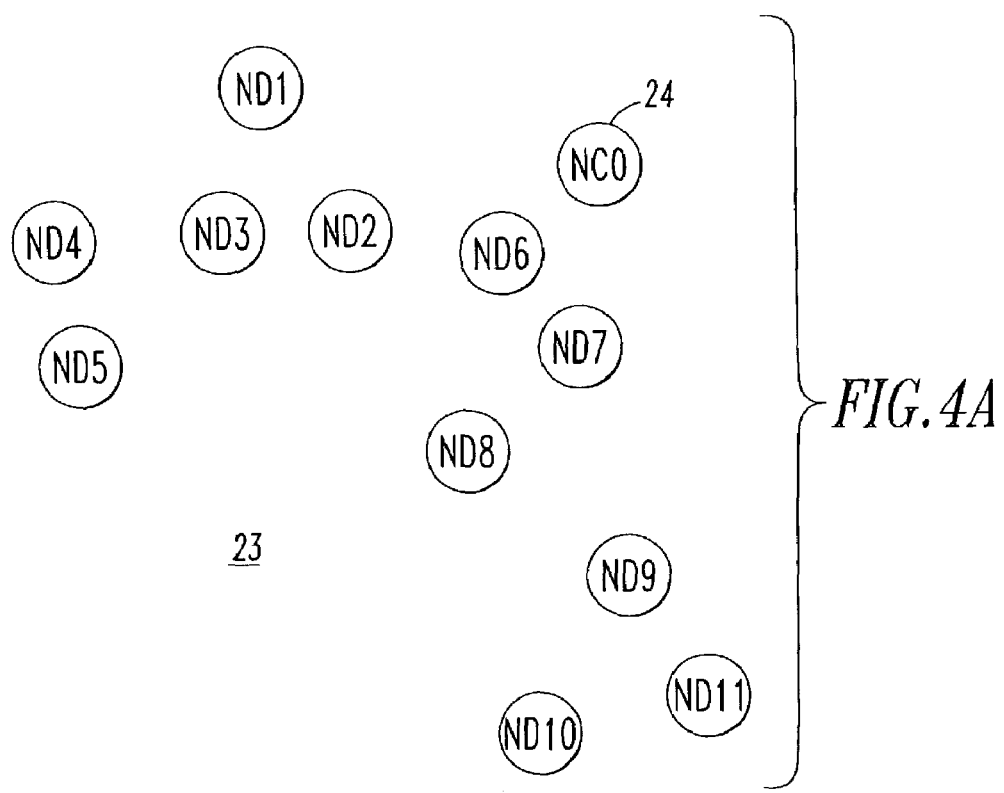
FIGS. 4A-4D are block diagrams of network formation topologies employing ad-hoc network formation principles in accordance with the present invention.
Figure 4B:
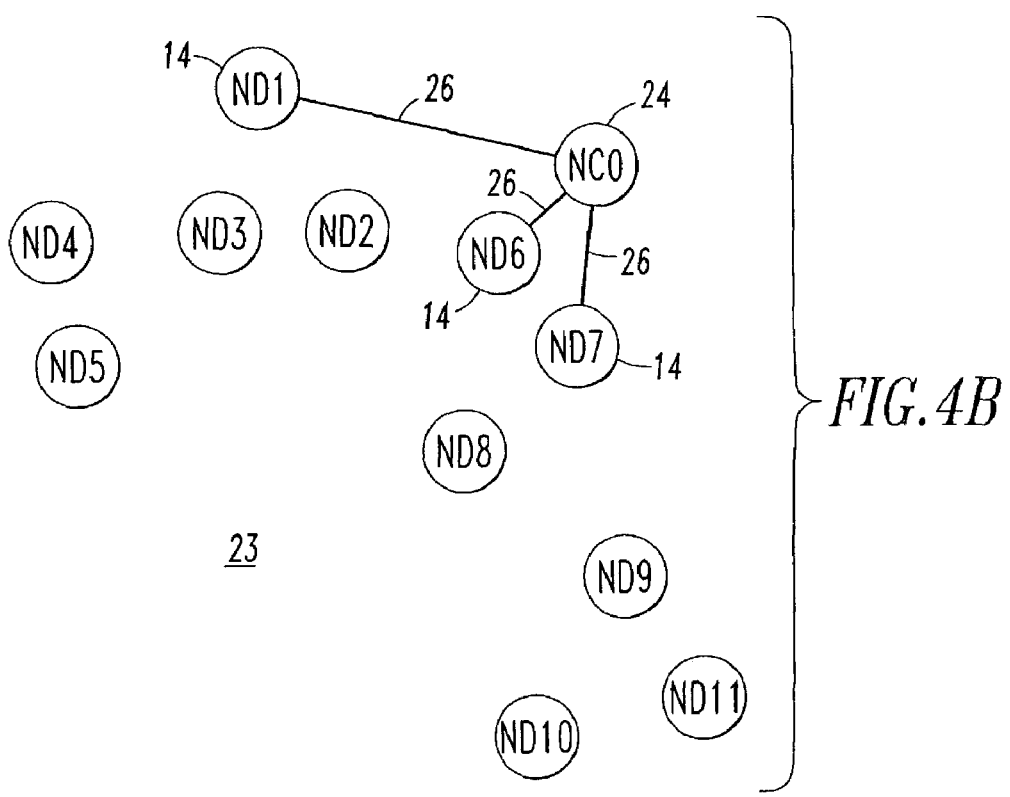

FIGS. 4A-4D show examples of network formation topologies employing the above network formation principles. First, as shown in FIG. 4A, the NC 24 (as shown by NC0) becomes active. Next, as shown in FIG. 4B, the nearest one-hop NDs 14 (as shown by ND1, ND6 and ND7) are accepted in the network 23 through the node links 26.

Figure 4C:
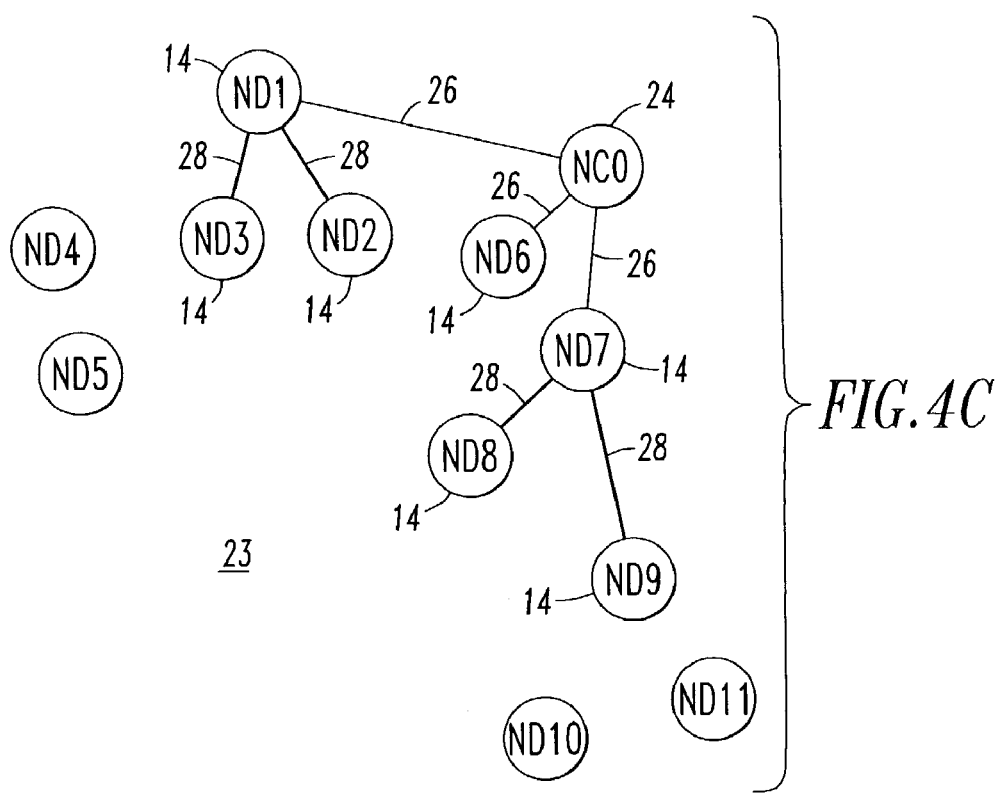
Figure 4D:
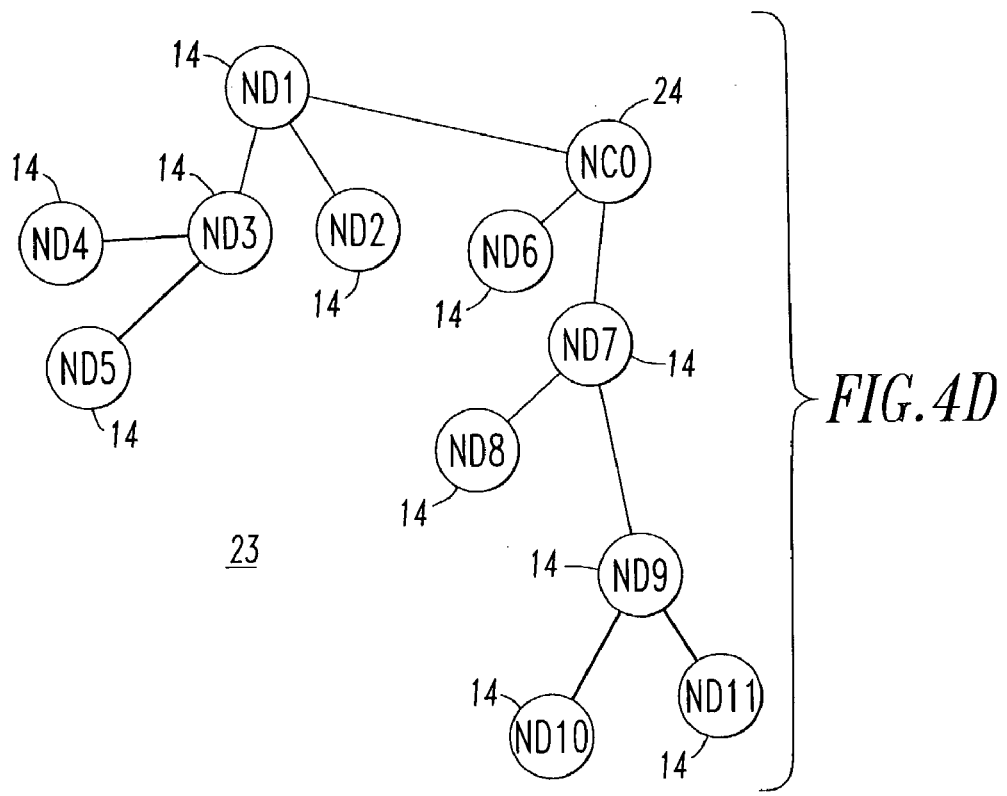

Then, as shown by FIG. 4C, the connected one-hop NDs 14 (as shown by ND1 and ND7) can relay a connect request from farther NDs 14 (as shown by ND2 and ND3 with ND1, and by ND8 and ND9 with ND7) in order that the NC 24 may accept them in the network 23 through the node links 28. In this example, the other connected ND 14 (as shown by ND6) does not have any neighboring nodes to be connected. Finally, as shown by FIG. 4D, the process continues until all nodes 14 get connected in the network 23.

The network joining procedure applies to NDs 14 not connected (e.g., as shown in FIGS. 4A-4C) and wanting to join the network 23. Each ND 14 proactively identifies neighbor NDs 14 already connected to the network 23. Preferably, this considers or includes the condition that those neighbor NDs are mains-powered. Any ND 14 within the range of this particular ND 14 will acknowledge its presence by identifying itself and reporting its capabilities. The ND 14 builds a routine table 30 (FIG. 6) with all the gathered information, which is the principal tool employed for upstream routing. The ND 14 sends a request to be connected to the network 23 by sending a message to the NC 24 using upstream routing, as discussed below. The NC 24 gives back a confirmation message using downstream routing to the ND 14, as also discussed below. If the ND 14 is accepted, then, at this point, the ND 14 is connected to the network 23.

The NC 24 and NDs 14 employ different ways to route messages in the network 23. The NDs 14 follow the localized routing principle, while the NC 24 follows the centralized routing principle. Under the localized routing principle, all messages generated from the ND 14 are directed to the NC 24 independently of what node is the recipient of the message. If the particular ND 14 and NC 24 are not linked directly, intermediate NDs 14 are used for relaying the messages. The message transfer method is the "upstream transfer" as described, below. In the "upstream transfer" mode, the intermediate NDs 14 may choose their "best" neighbor ND 14 available for transferring messages to the NC 24.

Under the NC's centralized routing principle, all messages generated or relayed by the NC 24 are directed to a particular ND 14 (i.e., the "downstream transfer" mode as described below). If the NC 24 and the particular ND 14 are not linked directly, then one or more intermediate NDs 14 may be employed for relaying the messages. In the "downstream transfer" mode, intermediate NDs 14 relay the message using the information provided by the NC 24.

Figure 5:
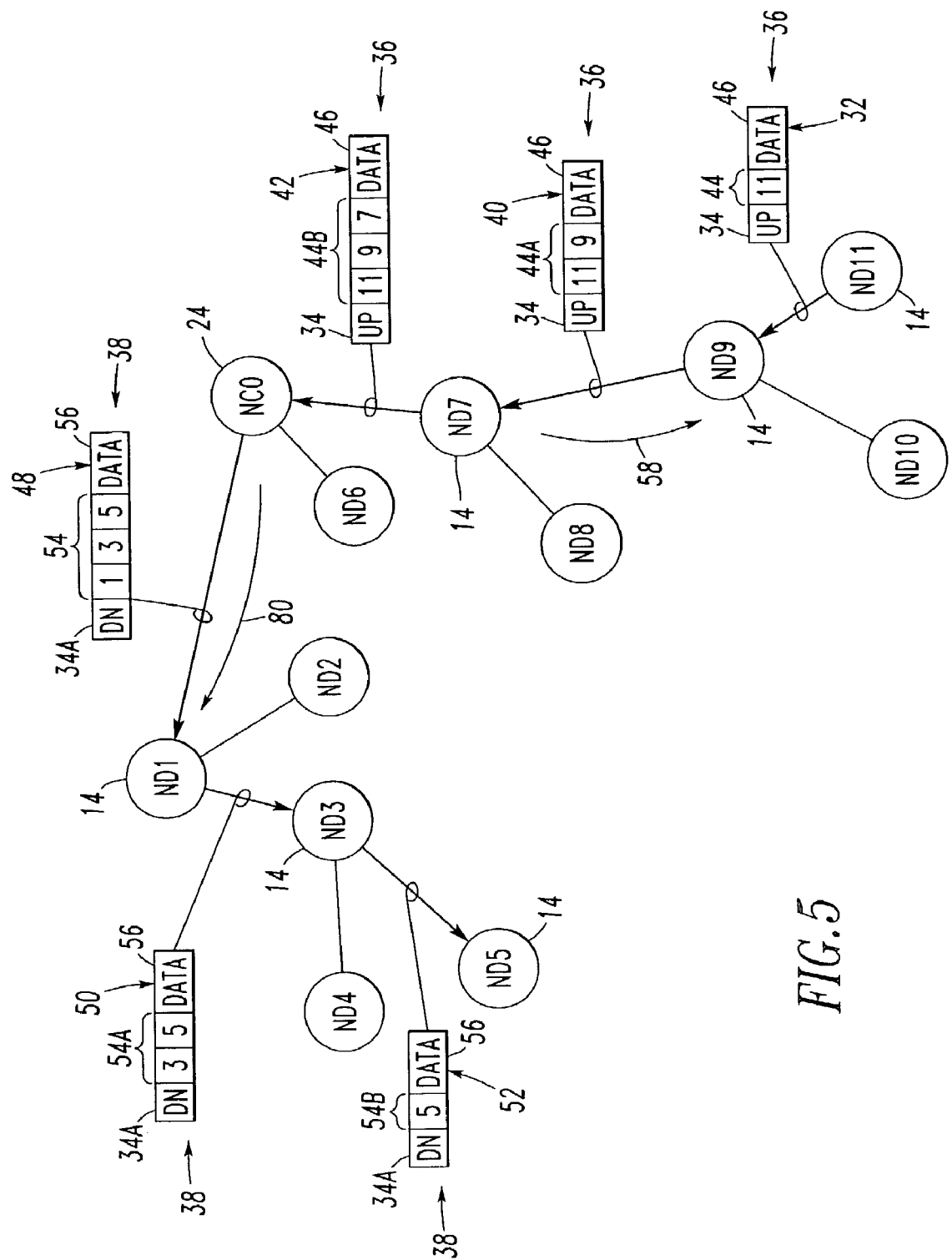
FIG. 5 is a block diagram of network messages for upstream transfer and downstream transfer modes in accordance with the present invention.

Referring to FIG. 5, on every message transfer, each message, such as 32, contains a field 34 that allows the ND 14 to recognize the two types of transfer: (1) upstream transfer 36 (i.e., from the particular ND 14 to the NC 24); or (2) downstream transfer 38 (i.e., from the NC 24 to the particular ND 14). For the "upstream transfer" mode 36, when one ND 14 needs to send or transfer a message to the NC 24, that ND 14 tries to choose the optimal path based on the local information it has regarding its neighbor NDs 14. This is determined by the neighbor selection algorithm 39 (FIG. 1), as described below, which employs a cost function encompassing a plurality of parameters that dynamically affect routing (e.g., number of hops, energy, link quality).

Figure 6:
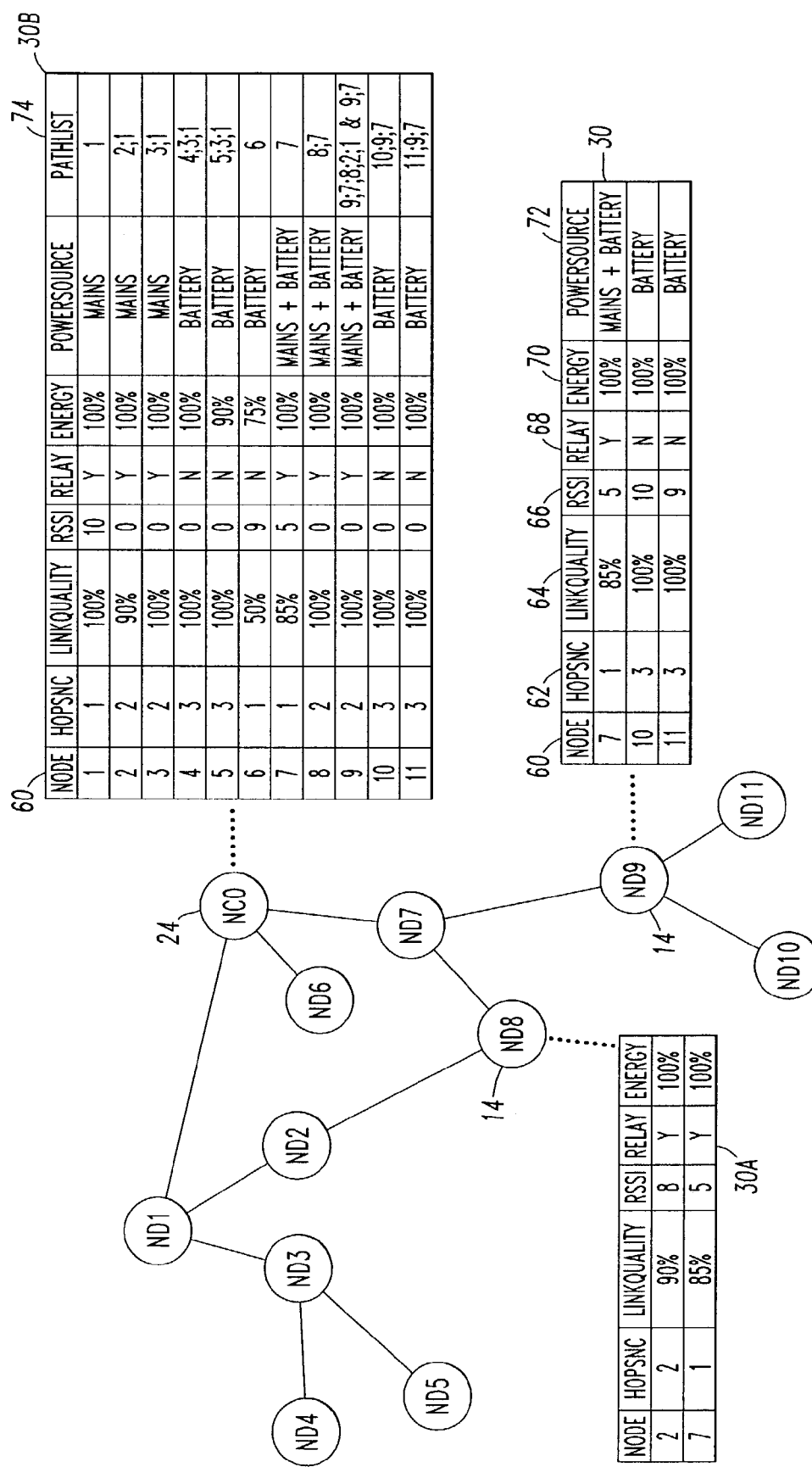
FIG. 6 is a block diagram including routing tables in accordance with the present invention.

In the "upstream transfer" mode 36, every time a message, such as 32, is passed from one ND 14 (e.g., ND11) to another ND 14 (e.g., ND9), the identifiers (e.g., addresses) associated with each relaying ND 14 are added to the message, thereby creating a source route, as shown by messages 32,40,42. Then, when the NC 24 receives a message, it determines the path which that message followed and this information is included into the NC routing table (e.g., 30B as shown in FIG. 6).

Continuing to refer to FIG. 5, message 32 includes three fields: (1) a direction field 34, which is set to represent "UP" for the upstream transfer mode 36; (2) an address list field 44; and (3) a data field 46. The messages 40 and 42 contain different address list fields 44A and 44B, respectively, and contain the same first direction field 34 and the same third data field 46 as are in the message 32. The address list field 44 includes the single address (e.g., 11) of the node ND11. The next address list field 44A includes the two addresses (e.g., 11 and 9) of the two nodes ND11 and ND9. Finally, the third address list field 44B includes the three addresses (e.g., 11, 9 and 7) of the three nodes ND11, ND9 and ND7.

In the "downstream transfer" mode 38, since the NC 24 knows at least one route to each petitioner ND 14 and to each connected ND 14, the NC 24 may select the optimum way to transfer the data to the final ND 14. All messages are sent with the full path information to the immediate ND 14 (e.g., ND1), which relays the message according to the source route. In turn, each ND 14 in the path removes its own identifier information when relaying the message (since that identifier is no longer needed for routing) until the final point is reached. This is shown by messages 48,50,52 of FIG. 5. Each ND 14 knows that it is to perform this procedure since the message itself contains information that denotes that the "downstream transfer" mode 38 operation is requested.

Message 48 includes three fields: (1) the direction field 34A, which is set to represent "DN" for the downstream transfer mode 38; (2) an address list field 54; and (3) a data field 56. The messages 50 and 52 contain different address list fields 54A and 54B, respectively, and contain the same first direction field 34A and the same third data field 56 as are in the message 48. The address list field 54 includes the three addresses (e.g., 1, 3 and 5) of the three nodes ND1, ND3 and ND5. The next address list field 54A includes the two addresses (e.g., 3 and 5) of the two nodes ND3 and ND5. Finally, the third address list field 54B includes the single address (e.g., 5) of the node ND5.

If one of the NDs 14 (e.g., ND7) is not able to relay a message for any reason (e.g., link down; routing table 30 exhausted), the ND 14 sends back a special "Route Error" message 58, which informs the preceding ND 14 (e.g., ND9) (or the NC 24) that the routing operation failed. In this instance, the routing method is complementary relative to the message source (e.g., if a message employing "downstream transfer" causes an error, then the Route Error message is sent back via the "upstream transfer" mode). The failure of one ND 14 to acknowledge a "Route Error" message causes the relaying node to discard the packet. A node that could not relay a "Route Error" message does not send back another "Route Error" message, since that would create a loop condition.

As an alternative to the "downstream transfer" mode 38 of FIG. 5, the NC 24 of FIG. 3 may employ a conventional full source routing (e.g., DSR) protocol in which, for example, the messages 48,50,52 of FIG. 5 include identical address list fields 54. In other words, the address list fields 54A,54B of the respective messages 50,52 would include the entire contents of the original address list field 54 (i.e., ND1,ND3, ND5). It will be appreciated, however, that the disclosed "downstream transfer" mode 38 is relatively more efficient since it transmits less address information in the subsequent messages 50,52 and, thus, consumes less power, thereby better maintaining battery life.

Each ND 14 maintains a routing table, such as 30,30A of FIG. 6, containing connected network device information.

Every time a message is exchanged between two neighbor NDs 14, the routing table, such as 30, which is employed for determining the "best" suitable relaying neighbor ND 14, is updated. The routing table 30 contains the following information: the node MAC address number (not shown); the node network address number 60 (Node); the number of hops 62 (HopsNC) to the NC 24; the link quality history 64 (LinkQuality) (i.e., messages acknowledged/messages sent); the Received Signal Strength Indication (RSSI) 66; the ND's relaying capabilities 68 (Relay) (Y: can, or N: cannot route messages); the ND's remaining energy 70 (Energy); the ND's power source 72 (PowerSource) (e.g., mains-powered; mains-powered with rechargeable battery recharge backup; non-mains-powered (battery only)); the number of neighbor NDs of the particular ND (not shown); and in the case of the NC 24, a list 74 (Path List) of all recorded and active paths from the particular Node 60.

A cost (or quality) function 76 (Quality 76 of FIG. 1) assigns a number to each ND 14 in the routing table 30 by taking into consideration all the corresponding information for that ND 14. This function employs the following principles: (1) the higher the link quality 64 (LinkQuality), the higher the Quality assigned to the ND 14 (at Node 60); (2) the higher the number of hops towards the NC 24, HopsNC 62, the lower the Quality assigned to the ND 14; (3) the higher the energy level, Energy 70, the higher the Quality assigned to the ND 14; and (4) the higher the Received Signal Strength Indication, RSSI 66, the higher the Quality assigned to the ND 14. An example of the Quality function 76 is shown by Equation 1:

$$\text{Quality(node)} = C_0 \times \text{LinkQuality(node)} - C_1 \times \text{HopsNC(node)} + C_2 \times \text{Energy(node)} + C_3 \times \text{RSSI(node)} \quad \text{(Eq. 1)}$$

wherein:

$C_0$, $C_1$, $C_2$ and $C_3$ are suitable weight constants (e.g., integers, such as 1, 2, 3; real numbers, such as 1.1, 2.2, 3.3); and LinkQuality(node), HopsNC(node), Energy(node) and RSSI (node) are obtained from the routing table 30 for the particular ND 14 (for the particular Node 60). Although the example of Equation 1 has been disclosed, a wide range of weight constant values, quality parameters and/or quality functions may be employed.

The neighbor selection algorithm 39 (FIG. 1) for the "upstream transfer" mode 36 of FIG. 5, sorts all nodes in the routing table 30 according to their Quality function 76. The node with the highest value of the Quality function 76 is the first or "best" candidate for relaying the message, unless there is a node marked by the NC 24 as being a "best" neighbor, as defined by a "route update" function 78 (FIG. 1). The message is sent to that "best" node. If the node acknowledges the message, then the relaying is completed.

However, if the node fails to acknowledge the message, then the parameter LinkQuality(node) 64 of FIG. 6 is updated in the routing table 30, thereby reflecting the failure of the link. Then, the next highest node from the Quality function 76 is selected as the second candidate for relaying the message. The message is sent to that node. If the node acknowledges the message, then the relaying is completed.

However, if that node fails to acknowledge the message, then the preceding paragraph is repeated until all nodes in the routing table 30 are used.

The Quality function 76 is recalculated (e.g., after a communication exchange) for all nodes. If the function value falls below a predetermined threshold, then that node is removed from the routing table 30.

For the "route update" function 78 of FIG. 1, since the NC 24 has complete information of the routes of all NDs 14, it is possible for it to optimize the overall routing according to the application's needs (e.g., traffic load; energy cost). In order to instruct a particular ND 14 about routing changes, the NC 24 generates a "route update" message 80 (FIG. 5), which forces the ND's routing table, such as 30, to pick a default route that the NC 24 considers "best", thereby bypassing the Quality function 76. This means that this "best" neighbor ND 14 will have the highest priority in the "upstream transfer" mode 36. However, all other entries of the routing table 30 maintain the priority order according to the neighbor selection algorithm 39. The "route update" messages 80 are sent from the NC 24 to the particular ND 14 using the "downstream transfer" mode 38. The "route update" message helps the NC 24 to balance the network load. A given ND 14 may be the best neighbor of several NDs 14 causing it to have to relay a relatively large count of messages. Since the NC 24 can build a complete map of the network, it can detect this and try to overwrite the routing table 30 of certain NDs 14 by defining a de facto "best" neighbor.

Every time a "Route Error" message 58 (FIG. 5) is received from another ND 14, as discussed above, the ND 14 updates the parameter LinkQuality 64 in the routing table 30 (FIG. 6) for that other ND 14, in order to reflect the failure of the link.

The NDs 14 may advertise (e.g., by periodically broadcasting for a period of time) their presence. In turn, each ND 14 may proactively identify its neighbors, which have a communication route to the NC 24. In response to the advertisement, the one or more NDs 14 within range may acknowledge their presence by identifying themselves.

As employed herein, the term "Neighbor Discovery" means a process wherein at least one ND 14 attempts to discover suitable other neighboring NDs 14 within its range of influence (i.e., a single-hop or a communication between only two NDs). This mode may be activated after the initialization of the network layer 6 (FIG. 1) or when the routing table (e.g., 30 of FIG. 6) is empty. This mode may be deactivated on command from the application layer 8 (FIG. 1), or a period of time after discovering at least one suitable neighbor ND which is a connected network device. That discovery is accomplished by receiving one or more response messages from one or more other NDs 14. Those response messages include an identification that the corresponding ND is a connected network device.

FIG. 7 is a block diagram of the ND 14 including an antenna port 82, RF front-end transceiver 84, micro-controller core 86 having ROM 88 and RAM 90, programming port 92, and sensor bus 94. The sensor bus 94 may include, for example, more or more analog-to-digital inputs, one or more digital-to-analog outputs, one or more UART ports, one or more Serial Peripheral Interface (SPI) and one or more digital I/O lines (not shown). The supply voltage 96 (VCC) may be, for example, about 3.0 to about 3.3 VDC, as referenced to ground (GND) 97, although any suitable voltage may be employed (e.g., 5 VDC, 1 VDC). The micro-controller core 86 may have, for example, ROM code space of about 32 kb and RAM space of about 2 kb.

Figure 8:
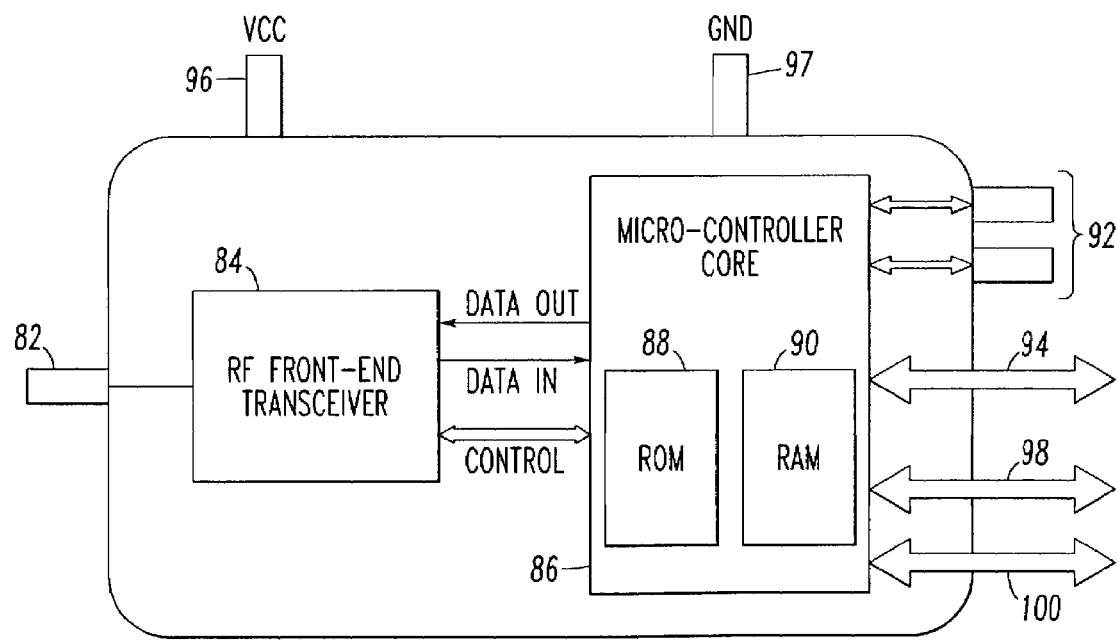
FIG. 8 is a block diagram of the network coordinator (NC) of FIG. 3, which is similar to the ND of FIG. 7, but also including an extended RAM port and an extended ROM port.

FIG. 8 is a block diagram of the NC 24, which is similar to the ND 14 of FIG. 7, but also including an extended RAM port 98 and an extended ROM port 100, in view of the relatively larger memory needs of the NC 24.

Referring to FIGS. 1-3 and 9, Table 1 shows examples of the network layer 6 primitives 102 used for providing the services, as discussed above. Although exemplary data and communication formats are disclosed, a wide range of such formats may be employed.

If this condition is false, then an NK-DATA.confirm primitive with the parameter ISOLATED is sent to the application layer 8 and the dialog ends.

TABLE 1

| | Primitive | Description | Parameter | Comments |
|---|---|---|---|---|
| Network Data | NK-DATA.request | Application layer wishes to transmit data | DstAddress, AppSeqNr, NsduLength, nsduData, deliveryconfirm | If the destination address is zero, then the destination is the NC |
| | NK-DATA.confirm | Application layer gets confirmation of a previously issued NK_DATA.request | Status, AppSeqNr | Status Range: SENT, ISOLATED, ERR_ROUTE, ERR_PRECONDITION |
| | NK-DATA.indication | Application layer gets notified of an incoming frame | SrcAddress, AppSeqNr, NsduLength, nsduData | If the source address is zero, then the source is the NC |
| | NK-DATA.response | Application layer confirms to the lower layers the successful reception of an application frame | AppSeqNr | This primitive indicates that the lower layers should resume operations (e.g., buffers are free) |
| Network Layer Management Entity | NLME-INITIALIZE.request | Initializes the network layer and does a neighbor discovery | None | After issuing this primitive, the network layer initializes the memory |
| | NLME-INITIALIZE.confirm | Confirms the initialization and returns a list of neighboring PAN ids | Status, PANIDsFound, PANIDList | Status Range: SUCCESS, ERR_NOPANS, ERR_PRECONDITION |
| | NLME-CONNECT.request | Instructs the device to enable the radio interface and to start participating in a particular network | PANid | |
| | NLME-CONNECT.confirm | Reports the result of a previously issued NLME-CONNECT.request | Status | Status Range: SUCCESS, ERR_NOPANS, ERR_PRECONDITION, ERR_REJECTED |
| | NLME-SLEEP.request | Instructs the radio interface to disable the radio interface (power save). All routing information is preserved. | None | |
| | NLME-SLEEP.confirm | Acknowledges the previous NLME-SLEEP.request | None | |
| | NLME-ROUTE-ERROR.indication | Indicates a failure to deliver a data frame to its destination | Status, AppSeqNr | Status Range: ERR_ROUTE, HOP_OVERFLOW, MESSAGE_SIZE_EXCEEDED |
| | NLME-GET.request | Request information about a Network PIB | PIBAtribute | |
| | NLME-GET.confirm | Reports the results of a previously issued NLME-GET.request | Status, PIBAttribute, PIBAttributeValue | Status Range: SUCCESS, UNSUPPORTED_ATTRIBUTE |
| | NLME-SET.request | Request to set a Network PIB value | PIBAttribute, PIBAttributeValue | |
| | NLME-SET.confirm | Reports the results of a previously issued NLME-SET.request | Status, PIBAttribute | Status Range: SUCCESS, UNSUPPORTED_ATTRIBUTE INVALID_VALUE |

The Network Data Service (NK-DATA) of Table 1 is responsible for end-to-end data transport among any node in the network 23 of FIG. 3.

The NK-DATA.request primitive of Table 1 requests the transfer of a NPDU (e.g., like the NPDU 18 of FIG. 2) from the application layer 8 to the local MAC entity 4. When an NK-DATA.request is called from the application layer 8 (the dialog starts), the network layer 6 tries to convey the Network Service Data Unit (NSDU) to its final destination.

The network layer 6 is first initialized by the application layer 8. Any preconditions (not shown) are verified before attempting to transmit the packet. If any of the preconditions is false, then an NK-DATA.confirm primitive with the parameter ERR_PRECONDITION is sent to the application layer 8 and the dialog ends.

The network layer 6 verifies whether it has connectivity to the NC 24 (e.g., the routing table 30 of FIG. 6 is not empty).

The PSR algorithm 12 determines that a packet cannot be delivered if a NWK_CONFIRM message with a ERR_ROUTE parameter is received from a peer network layer 6. The network layer 6 will then generate either: (1) an NK-DATA.confirm primitive with the parameter ERR_ROUTE to the application layer 8 if the NK-DATA.request dialog is still open (the dialog will close after this primitive), or (2) an NLME-ROUTE-ERROR.indication with the parameter ERR_ROUTE to the application layer 8 if the NK-DATA.request dialog was already closed because of a previous NK-DATA.confirm primitive.

Once the routing process determines the best route, the packet is sent to the MAC layer 4 using its data services. If the peer acknowledges the packet and the parameter deliverconfirm is false, a NK-DATA.confirm primitive with the parameter SENT is sent to the application layer 8 and the dialog ends. In this context, SENT means the packet was delivered and it is believed to reach its destination unless a NWK_CONFIRM message with a ERR_ROUTE parameter proves the contrary.

If the peer ND acknowledges the packet and the parameter deliverconfirm is true, then the dialog remains open until a NWK_CONFIRM message with result MSG_CONFIRM is received from the node at DstAddress (which confirms receipt of the NPDU). At this point, the network layer 6 sends the NK-DATA.confirm primitive with the parameter SENT to the application layer 8 and the dialog ends. In this context, SENT means the packet was successfully delivered.

The NK-DATA.confirm primitive confirms the end of transmission of an NPDU, such as 18, from the local NWK entity to its peer ND (next hop if delivery confirmation is not requested, final destination otherwise). On receipt of this primitive, the application layer 8 is notified of the result of its request to transmit. The parameter status contains the result of the transmission attempt.

The NK-DATA.indication primitive requests the transfer of a NPDU from the network layer 6 to the local application layer 8. The NK_DATA_indication primitive is generated by the network layer entity and issued to its application layer entity to transfer a received NSDU. This primitive is not generated if the received nsduLength field is zero or greater than nwkMaxNPDUsize. On receipt of this primitive, the application layer 8 is notified of the arrival of an NPDU across the network data service. The application layer 8 ends the dialog with a NK-DATA.response primitive. The network layer 6 then releases all the resources assigned to this particular indication (e.g., buffers, sequence numbers).

The NK-DATA.response primitive acknowledges the transfer of a NPDU from the network layer 6 to the application layer 8. When an NK-DATA.response is called from the application layer 8, the network layer 6 closes the dialog originated by the corresponding NK-DATA.indication primitive. Resources (e.g., buffers; timers) are freed associated with the related NSDU involved in the dialog. Various preconditions (not shown) are verified before attempting to process this primitive. If any of the preconditions is false, then the primitive is ignored and the dialog ends. Preferably, the false precondition is recorded in a log file or a similar mechanism (not shown) because this implies a condition that should never happen.

The network layer management entity (NLME) of Table 1 allows the application layer 8 to use network services apart from data transport. The NLME is composed of three sets of primitives: State, Exceptions, and PIB Management. The State set is composed of "initialize", "connect" and "sleep". The initialization phase occurs only once; after that, a node will be either active (connected) or sleeping. The Exception set is used to notify the application layer 8 of any errors or special situations about which it needs to know. The PIB management set is used to access and modify the network layer PIB.

The NLME-INITIALIZE.request primitive requests the initialization of the application layer 8 to the network layer 6. When an NLME-INITIALIZE.request is called from the application layer 8 (dialog starts), the network layer 6 initializes according to its network role (i.e., ND or NC). If there is a dialog already opened (e.g., a NK-DATA.request has been received but the response is still pending), the network layer 6 issues a NLME-INITIALIZE.confirm with the Status parameter set to ERR_PRECONDITION to the application layer 8 indicating the primitive cannot be executed.

The initialization for a network device (ND) 14 initializes memory, clears all routing information, and starts the network joining procedure. The dialog closes when the network layer 6 issues a NLME-INITIALIZE.confirm to the application layer 8 with a list of PAN-ID numbers available for further connection. The initialization for a network coordinator (NC) 24 initializes memory, clears all routing information, and starts the network joining procedure. The dialog closes when the network layer 6 issues a NLME-INITIALIZE.confirm to the application layer 8 with the PAN-ID number assigned to the network 23.

The NLME-INITIALIZE.confirm primitive confirms the end of the initialization process at the network layer 6. On receipt of this primitive, the application layer 8 is notified of the result of its request to initialize the network 23. The parameter status contains the result of the initialization attempt.

The NLME-CONNECT.request primitive instructs the network layer 6 to start participating in a particular PAN-ID requested from the application layer 8. When an NLME-CONNECT.request is called from the application layer 8, the network layer 6 tries to connect with the NC 24 and get authorization to transmit data packets within this PAN-ID. The network layer 6 should be already initialized via the NLME-INITIALIZE.confirm primitive. Also, various preconditions (not shown) are verified before attempting to process the primitive. If any of the preconditions is false, then the network layer 6 issues a NLME-CONNECT.confirm with the Status parameter ERR_PRECONDITION to the application layer 8 and the dialog ends.

The PAN-ID is not found in the network 23 if one of the following conditions happens: (1) the PSR algorithm 12 determines there is no route towards the NC 24; (2) the network layer 6 is isolated; or (3) a related NWK_CONFIRM message with a ERR_ROUTE parameter is received during the connection attempt. As a result, the network layer 6 issues a NLME-CONNECT.confirm with the Status parameter ERR_NOPANS to the application layer 8 and the dialog ends.

If the NC 24 rejects the application layer's petition to join the PAN-ID, then the network layer 6 issues a NLME-CONNECT.confirm with the Status parameter ERR_REJECTED to the application layer 8 and the dialog ends.

If the NC 24 accepts the application layer's petition to join the PAN-ID, then the NC 24 accepts the petition to join the network 23, the network layer 6 issues a NLME-CONNECT.confirm with the Status parameter SUCCESS to the application layer 8 and the dialog ends.

The NLME-CONNECT.confirm primitive confirms the end of a connection attempt requested by the application layer 8, and gives the result of such attempt. On receipt of this primitive, the application layer 8 is notified of the result of its request to connect. The parameter Status contains the result of the transmission attempt.

The NLME-SLEEP.request primitive instructs the network layer 6 to disable the radio interface (e.g., in order to save power) and all routing information is preserved. When an NLME-SLEEP.request is called from the application layer 8, the network layer 6 tries to put the radio interface and other power-controllable items in power down mode. If there is a dialog open between the application layer 8 and the network layer 6, this sleep request primitive is executed only after the previous dialog finishes. Finally, the network layer 6 issues a NLME-SLEEP.confirm primitive indicating the command has been executed.

The NLME-SLEEP.confirm primitive confirms the network layer 6 is in the power savings mode. On receipt of this primitive, the application layer 8 is notified that the network layer 6 is in the power savings mode.

The NLME-ROUTE-ERROR.indication primitive notifies the upper layers 8 that there is an unrecoverable routing error detected at the network layer 6. The corresponding parameter status contains the nature of the error. When the network layer 6 receives a NWK_CONFIRM message with an ERR_ROUTE parameter, that means the messages could not be relayed by an intermediate node. The network layer 6 will then generate an NLME-ROUTE-ERROR.indication with the parameter ERR_ROUTE to the upper layers 8. Otherwise, when the network layer 6 receives a NWK_CONFIRM message with a RTE_MAXADDRESS parameter, that means the messages could not be relayed by an intermediate node, since the maximum number of hops (nwkMaxAddrWidth of Table 11) had been reached. The network layer 6 will then generate an NLME-ROUTE-ERROR.indication with the parameter HOP_OVERFLOW to the upper layers 8.

The NLME-GET.request primitive requests information about a given NWK PIB attribute. On receipt of this primitive, the NLME attempts to retrieve the requested NWK PIB attribute from its database. If the identifier of the PIB attribute is not found in the database, then the PLME issues the NLME-GET.confirm primitive with a Status value of UNSUPPORTED_ATTRIBUTE and closes the dialog. Otherwise, if the requested PHY PIB attribute is successfully retrieved, then the PLME issues the NLME-GET.confirm primitive with a Status value of SUCCESS, the PIBAttributeValue field contains the value requested, and the dialog closes.

The NLME-GET.confirm primitive reports the results of an information request from the NWK PIB. On receipt of this primitive, the upper application profile layer 9 is notified of the results of its request to read a NWK PIB attribute. If the request to read a NWK PIB attribute was successful, then the status parameter is set to SUCCESS. Otherwise, the status parameter indicates the error.

The NLME-SET.request primitive attempts to set the indicated NWK PIB attribute to the given value. On receipt of this primitive, the NLME attempts to write the given value to the indicated NWK PIB attribute in its database. If the PIBAttribute parameter specifies an attribute that is not found in the database, then the NLME issues the PLME-SET.confirm primitive with a status of UNSUPPORTED_ATTRIBUTE and finishes the dialog. If the PIBAttributeValue parameter specifies a value that is out of the valid range for the given attribute, then the NLME issues the PLME-SET.confirm primitive with a status of ERR_INVALIDPARAM and finishes the dialog. Otherwise, if the requested NWK PIB attribute is successfully written, then the NLME issues the NLME-SET.confirm primitive with a status of SUCCESS and finishes the dialog.

The NLME-SET.confirm primitive reports the results of the attempt to set a PIB attribute. On receipt of this primitive, the upper layer 8 is notified of the result of its request to set the value of a NWK PIB attribute. If the requested value was written to the indicated NWK PIB attribute, then the status parameter is set to SUCCESS. Otherwise, the status parameter indicates the error.

Figure 9:
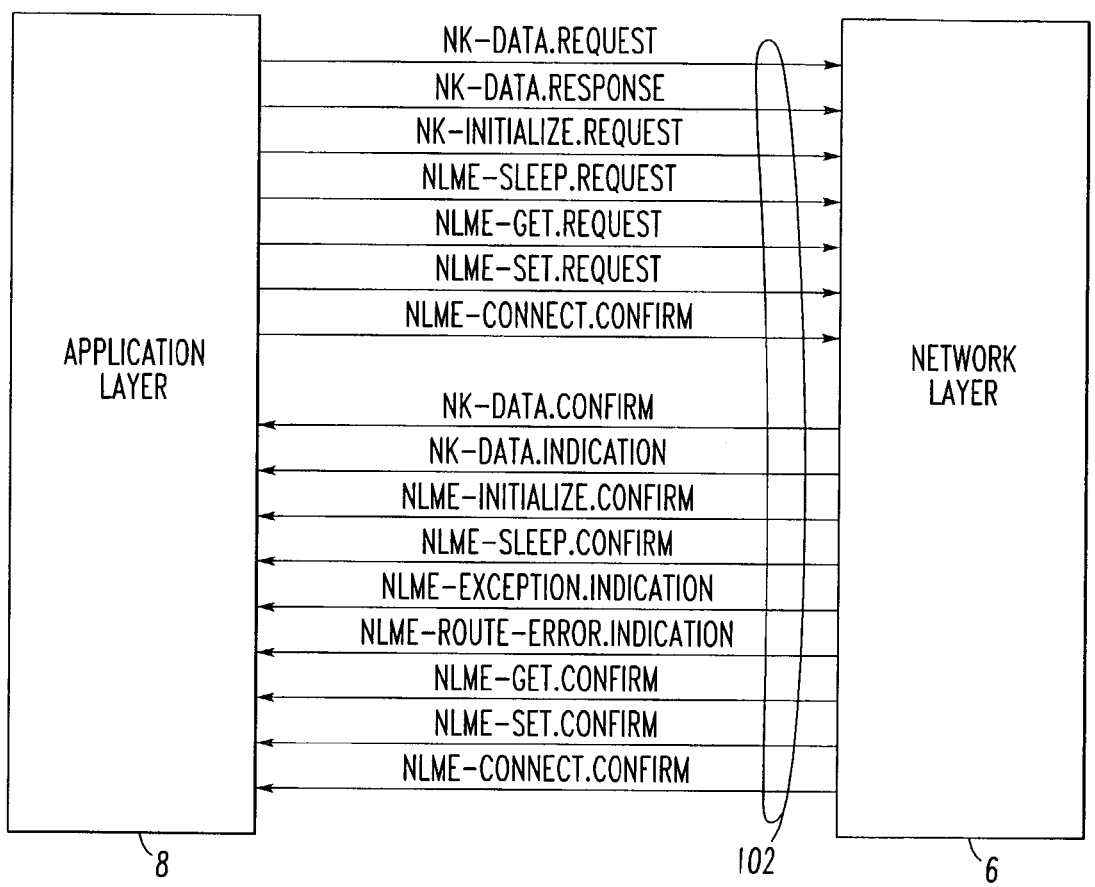
FIG. 9 is a block diagram showing the directionality of the primitives of the network data service (NK-DATA) and the network layer management entity (NLME) in accordance with the present invention.

FIG. 9 shows graphically the directionality of each primitive. The network data service (NK-DATA) is composed of four primitives that match their counterparts in the lower layers 4,6. The network management service takes care of connecting and updating the network 23. All routing functionality is encapsulated in the network layer 6 definition.

The domain of valid messages between two network layer peer entities is shown in Table 2.

TABLE 2

|  | Message Identifier | Message Parameters |
| --- | --- | --- |
| Network Data | NWK_DATA | AppSeqNr, PeerAddress, NsduLength, NsduData, NeedsConfirmation, Dir, AddrCount, AddressList |
| Network Layer Management | NWK_PROPERTIES | CanRoute, Energyleft, PowerSource, LinkQuality, ShortAddress, NeighborCount, NeighborList, Dir, AddrCount, AddressList |
|  | NWK_CONFIRM | Result, Parameter, Dir, AddrCount, AddressList |
|  | NWK_ROUTE_UPDATE | AppSeqNr, RouteList, Dir, AddrCount, AddressList |

All messages, in abstract form, are represented by the following format:

Message Identifier (Message Parameter 1, Message Parameter 2, ... ).

For example, the message NWK_DATA is represented by:

NWK_DATA(AppSeqNr, AddrCount, AddrList, Dir, PeerAddr, NsduLength, NsduData, Confirm).

The frames in the network layer 6 are described as a sequence of fields in a specific order. There are three field groups in every message encoded: (1) NWK_HEADER: all parameters belonging to a particular message are encoded in this group; (2) NWK_ROUTE: the parameters AddrCount, AddrList and Dir as employed for routing purposes are encoded in this group for all messages; and (3) NWK_DATA: the parameters NsduLength and NsduData (i.e., the payload) are encoded in NWK_DATA messages.

Each frame field is to be mapped to a message identifier, a message parameter, a message routing information or an encoding tag. Table 3 shows the general network layer transfer syntax and frame format. All frame formats are depicted in the order in which they are transmitted by the physical layer 2, from left to right, where the leftmost bit (least significant) is transmitted first in time. For fields that are longer than a single octet, the least significant byte is sent first.

TABLE 3

| Field Size (Octets:bits) | 0:3 | 0:5-8.0 | 0:4-4:0 | 0:0 - nwkMaxNPDUsize + 1 |
| --- | --- | --- | --- | --- |
| Description | Message Identifier | Message Parameters (except NsduData, NsduLength, Dir, AddrCount, & AddrList) | Message Routing Information (Dir, AddrCount, & AddrList) | Frame Payload (NsduLength, NsduData) |

TABLE 3-continued

| NWK_HEADER | NWK_ROUTE | NWK_PAYLOAD |
|---|---|---|
| Time Direction→ Lsb first, LSB first | | |

The following presentation context general rules are observed in all encoding and decoding processes: (1) no encoding is done if any of the message parameter preconditions is false; (2) when decoding, if any of the message parameter preconditions is false, then the parser generates an exception and discards the message; (3) each parameter corresponds to the field bearing the same name; (4) the value codes for each message identifier (representing the message header) are indicated in the frame encoding section of each message; (5) for parameters that represent sets, their encoding is done at the bit level without any padding or byte alignment (e.g., a parameter of type U4[3] (3 nibbles) is encoded in 12 bits; (6) unless explicitly defined, enumerated types are encoded using the value of 0×00 for the first valid identifier, 0×01 for the second, and so on; the length of the field is fixed to the minimum number of bits needed to represent the highest ordinal in the set (e.g., the enumeration {SUCCESS, ERR_NOPANS, ERR_REJECTED, ERR_PRECONDITION} is encoded as {0,1,2,3}, using a maximum of 2 bits); and (7) for logic values, true is encoded as 1 and false is encoded as 0, with a length of one bit.

The following describes the semantics, abstract and transfer syntax for all network layer peer messages including NWK_DATA, NWK_PROPERTIES, NWK_CONFIRM, and NWK_ROUTE_UPDATE. NWK_DATA is employed for transferring data between peer nodes. Table 4 specifies the abstract syntax and parameters for the NWK_DATA message.

TABLE 4

Message NWK_DATA(AppSeqNr, AddrCount, AddrList, Dir, PeerAddr, NsduLength, NsduData, Confirm)

| Parameter | Type | Preconditions | Description |
|---|---|---|---|
| Dir | Enumerated | {Upstream, Downstream} | If Dir is Downstream, the message was relayed by the NC |
| Confirm | BOOL | | |
| AppSeqNr | U4 | None | Number supplied by the peer application layer that could be used for sequence control |
| PeerAddr | U64 | ≠ nwkLocalAddress | When Dir is upstream, this parameter shows the Destination address. Otherwise, it shows the Originator address. If this value is zero, then the NC is the source |
| AddrCount | U3 | | |
| AddrList | U4[ ] | [ ]←AddrCount | List of Source and intermediate Addresses in compressed form built by the PSR algorithm from/to the NC |
| NsduLength | U8 | ≦nwkMaxNPDUsize & >0 | Number of bytes contained in the nsduData packet |
| NsduData | U8[ ] | None | The set of bytes comprising the NPDU received |

Table 5 specifies the transfer syntax and frame encoding for the NWK_DATA message. There may be various (e.g., one, two, three or more) fields not associated to any NWK_DATA parameter. For example, two are used for encoding convenience: (1) FromNC: when this field is 0, it means that the field PeerAddr is present; and (2) Padding1: is filled with zeros when AddrCount is even and is employed for byte alignment purposes.

TABLE 5

| Field Size (Octets:bits) | 0:3 | 0:1 | 0:3 | 0:1 | 0:0/8:0 | 0:1 | 0:3 | 0:4 x AddrCount | 0:0/0:4 | 1 | 0:0 - nwkMaxNPDUsize |
|---|---|---|---|---|---|---|---|---|---|---|---|
| Field | NWK_DATA 0x00 | Confirm | AppSeqNr | FromNC | PeerAddr | Dir | AddrCount | AddrList | Padding1 | NsduLength | NsduData |
| Time Direction→ Lsb first, LSB first | NWK_HEADER | | | | | NWK_ROUTE | | | | NWK_PAYLOAD | |

There are five frame encoding rules for transferring NWK_DATA parameters to message fields: (1) the presentation context general rules (as discussed above after Table 3) are followed; (2) the Message Identifier has the value of 0x00, indicating the message is of type NWK_DATA; (3) if the PeerAddress parameter value is zero, FromNC is 0x01 and the PeerAddress field is not transmitted, otherwise FromNC is 0x00 and the PeerAddress parameter is associated to the field; (4) if AddrCount parameter is an even number, then Padding1 is 0x00, otherwise it is not transmitted; and (5) all parameters are associated to their corresponding fields, following the order indicated by Table 5.

There are six frame decoding rules for transferring NWK_DATA message fields to parameters: (1) the presentation context general rules (as discussed above after Table 3) are followed; (2) the Message Identifier has the value of 0x00, indicating the message is of type NWK_DATA; (3) if the AddrCount parameter is an odd number, then Padding2 exists; (4) if FromNC is false, then the PeerAddress field exists and is associated with the field, otherwise, the value associated to the PeerAddress parameter is 0x00; (5) the Padding1 value is ignored; and (6) all fields are associated to their corresponding parameters, following the order indicated by Table 5.

The NWK_DATA primitive is generated by the Network layer entity and is issued to its Application layer entity to transfer a received NSDU. This primitive is not generated if any of the preconditions shown in Table 4, above, is false in the originator side; instead, an exception is raised. On receipt of this message, the network layer 6 is notified of the arrival of an NPDU across the NWK data service. The following operations are checked by the protocol entity: (1) if the receiving message buffer (e.g., in RAM 90 of FIGS. 7 and 8) is full, then the message is discarded and a debugging exception is raised; (2) if the message is duplicated (same PeerAddr and AppSeqNr as the last message received), then the message is discarded and a debugging exception is raised; (3) the network layer 6 verifies the preconditions shown in Table 4 are met, and if this is not true, then the message is discarded and an exception is raised; and (4) if the Message was supposed to be relayed, and a precondition violation was detected, then a NWK_CONFIRM message with Result code of EXP_CORRUPTED is sent to the originator.

If the node determines it is the recipient of the NWK_DATA Data Message, then it: (1) checks if Confirm is true, which means that the message originator (whose address is in PeerAddr) expects a delivery confirmation, and the network layer 6 sends a NWK_CONFIRM message with Result code of MSG_CONFIRM to the originator; (2) the node updates its routing table and quality metrics; and (3) the node issues a NK-DATA.indication primitive to the upper layers 8, which associate all parameters to the corresponding field received, and the network layer 6 sends a NWK_CONFIRM message with Result code of MSG_CONFIRM to the originator.

If the node determines it must relay the NWK_DATA Data Message, then it: (1) checks whether the maximum number of hops allowed (nwkMaxAddrWidth of Table 11) has been reached and, if true, raises a debugging exception, discards the message, and the network layer 6 sends a NWK_CONFIRM message with Result code of RTE_MAXADDRESS to the originator; (2) the node retransmits the packet to its best neighbor, modifying only AddrCount and AddrList (and PeerAddr in the case of a NC 24) according to the PSR algorithm 12; the message is not discarded until a positive acknowledgement from the MAC layer 4 indicates that the message has been relayed successfully to its neighbor; and (3) if all retransmission attempts failed, then the original message is discarded and the network layer 6 sends a NWK_CONFIRM message with Result code of ERR_ROUTE to the originator.

The message NWK_PROPERTIES is used by every node as a means of advertising certain relevant information needed for connection and maintenance of the network. Table 6 specifies the Abstract Syntax and parameters for the NWK_PROPERTIES message.

TABLE 6

Message NWK_PROPERTIES(Dir, CanRoute, EnergyLeft, PowerSource, LinkQuality, ShortAddress, NeighborCount, NeighborList)

| Parameter | Type | Preconditions | Description |
| --- | --- | --- | --- |
| Dir | Enumerated | ∈{Upstream, Downstream} | If Dir is Downstream, the message was relayed by the NC |
| CanRoute | BOOL | | If TRUE, the node can relay data through it |
| EnergyLeft | U8 | | Indicator of how much energy the node has. The closer to zero, less energy remains |
| PowerSource | Enumerated | ∈{MainsPowered, BatteryOnly, BatteryBackup} | Type of power the node has |
| LinkQuality | U8 | | Reflects the probability of having a packet being relayed: 0 is 100% success, 0xFF is 100% failure |
| ShortAddress | U4 | | 4 bit compressed address assigned to the device |
| NeighborCount | U3 | | List of neighbors associated with the node |
| NeighborList | U4[ ] | [ ]← NeighborCount | List of Source and intermediate Addresses in compressed form built by the PSR algorithm from/to the NC |

Table 7 specifies the transfer syntax and frame encoding for the NWK_PROPERTIES message. There may be various (e.g., one, two, three or more) fields not associated with any NWK_PROPERTIES parameter; they are used for encoding convenience. For example: (1) Padding1: is filled with zeros when NeighborCount is even and is employed for byte alignment purposes; and (2) Padding2: is filled with zeros when AddrCount is even and is employed for byte alignment purposes.

TABLE 7

| Field Size (Octets:bits) | 0:2 | 0:1 | 0:2 | 0:3 | 1 | 1 | 0:4 | 0:4 x NeighborCount | 0:0/0:4 | 0:1 | 0:3 | 0:4 x AddrCount | 0:0/0:4 |
|---|---|---|---|---|---|---|---|---|---|---|---|---|---|
| Field | NWK_PROPERTIES 0x01 | CanRoute | PowerSource | NeighborCount | LinkQuality | EnergyLeft | ShortAddress | NeighborList | Padding1 | Dir | AddrCount | AddrList | Padding2 |
| Time Direction→ Lsb first, LSB first | NWK_HEADER | | | | | | | | | NWK_ROUTE | | | |

There are five frame encoding rules for transferring NWK_PROPERTIES parameters to message fields: (1) the presentation context general rules (as discussed above after Table 3) are followed; (2) the Message Identifier has the value of 0x01, indicating the message is of type NWK_PROPERTIES; (3) if the AddrCount parameter is an even number, then Padding2 is 0x00, otherwise it is not transmitted; (4) if the NeighborCount parameter is an even number, then Padding1 is 0x00, otherwise it is not transmitted; and (5) all parameters are associated to their corresponding fields, following the order indicated by Table 7.

There are four frame decoding rules for transferring NWK_PROPERTIES message fields to parameters: (1) the presentation context general rules (as discussed above after Table 3) are followed; (2) the Message Identifier has the value of 0x01, indicating the message is of type NWK_PROPERTIES; (3) Padding1 and Padding2 are discarded; and (4) all fields are associated to their corresponding parameters, following the order indicated by Table 7.

The network layer 6 generates the NWK_PROPERTIES primitive when: (1) it is trying to connect to a PAN-ID; and (2) a peer node is asking for association information. On receipt of this message, the network layer 6 is notified of the properties of a peer node. A specific reaction depends upon the context in which the message was received.

If the node determines that it is the recipient of the NWK_PROPERTIES message, then it updates the routing table (e.g., 30 of FIG. 6) and its quality metrics. Otherwise, if the node determines that it must relay this message, then it: (1) updates its routing table and quality metrics, if needed; (2) checks whether the maximum number of hops allowed has been reached and, if true, raises a debugging exception, discards the message, and the network layer 6 sends a NWK_CONFIRM message with Result code of RTE_MAXADDRESS to the originator; (3) the node retransmits the packet to its best neighbor (as defined by the NC), modifying only AddrCount and AddrList according to the PSR algorithm 12; the message is not discarded until a positive acknowledgement from the MAC layer 4 indicates that the message has been relayed successfully to its neighbor; and (4) if all retransmission attempts fail, then the original message is discarded and the network layer 6 sends a NWK_CONFIRM message with Result code of ERR_ROUTE to the originator. The NWK_CONFIRM message is employed by every node as a mechanism for confirming or denying some network services or functions. Table 8 specifies the Abstract Syntax and parameters for the NWK_CONFIRM message.

TABLE 8

| Message NWK_CONFIRM(Result, ExtraInfo, Dir, AddressList) | | | |
|---|---|---|---|
| Parameter | Type | Preconditions | Description |
| Result | Enumerated | ϵ{ERR_ROUTE, CONNECT, ERR_CONNECT, MSG_CONFIRM, RTE_MAXADDRESS, EXP_CORRUPTED} | |
| ExtraInfo | U8 | | Detailed information depending upon the value of Result |

The following preconditions apply to the NWK_PROPERTIES message: (1) if the receiving message buffer is full, then the message is discarded and a debugging exception is raised; (2) the network layer 6 verifies the preconditions as shown in Table 6 are met and, if not true, then the message is discarded and an exception is raised; and (3) if the Message was supposed to be relayed, and a precondition violation was detected, then a NWK_CONFIRM message with Result code of EXP_CORRUPTED is sent to the originator.

Table 9 specifies the transfer syntax and frame encoding for the NWK_CONFIRM message. There may be various (e.g., one, two, three or more) fields not associated with any NWK_CONFIRM parameter and are employed for encoding convenience. For example: (1) Padding1: is filled with zeros when AddrCount is even and is employed for byte alignment purposes; and (2) Reserved: is filled with zeros.

TABLE 9

| Field Size (Octets:bits) | 0:2 | 0:3 | 0:3 | 1 | 0:1 | 0:3 | 0:4 x AddrCount | 0:0/0:4 |
|---|---|---|---|---|---|---|---|---|
| Field | NWK_CONFIRM 0x02 | Result | Reserved | ExtraInfo | Dir | AddrCount | AddrList | Padding1 |
| Time Direction→ Lsb first, LSB first | NWK_HEADER | | | | NWK_ROUTE | | | |

There are six frame encoding rules for transferring NWK_CONFIRM parameters to message fields: (1) the presentation context general rules (as discussed above after Table 3) are followed; (2) the Message Identifier has the value of 0x02, indicating the message is of type NWK_CONFIRM; (3) if the AddrCount parameter is an even number, then Padding1 is 0x00, otherwise it is not transmitted; (4) if the ExtraInfo parameter is not used (depending upon the value of Result), then it is not transmitted; (5) Reserved: is filled with zeros; and (6) all parameters are associated with their corresponding fields, following the order indicated by Table 9.

There are four frame decoding rules for transferring NWK_CONFIRM message fields to parameters: (1) the presentation context general rules (as discussed above after Table 3) are followed; (2) the Message Identifier has the value of 0x02, indicating the message is of type NWK_CONFIRM; (3) Padding1 and Reserved are discarded; and (4) all fields are associated with their corresponding parameters, following the order indicated by Table 9.

The network layer 6 generates the NWK_CONFIRM primitive when: (1) the NC 24 is confirming the acceptance of a node in its PAN-ID; in this case, Result has the value of CONNECT, and ExtraInfo contains the DSR short address assigned to the joining ND 14; (2) the NC 24 is denying a node in its PAN-ID; in this case, Result has the value of ERR_CONNECT, and ExtraInfo is not used; (3) a peer node sends confirmation of data delivery to a particular address; in this case, Result has the value of MSG_CONFIRM, and ExtraInfo contains the AppSeqNr corresponding to the originating Data Request; (4) a peer node cannot relay a message to a particular address because of a routing error; in this case, Result has the value of ERR_ROUTE, and ExtraInfo is not used; (5) a peer node cannot relay a message to a particular address because a maximum number of addresses (nwkMaxAddress of Table 11) was exceeded; in this case, Result has the value of RTE_MAXADDRESS, and ExtraInfo provides the estimated number of hops needed to reach the NC 24; and (6) a peer node cannot relay a message to a particular address because the message was corrupted; in this case, Result has the value of EXP_CORRUPTED, and ExtraInfo contains the message identifier of the offending message and the AppSeqNr, if applicable. Table 10 shows a summary of all possible values and uses of the ExtraInfo Parameter.

TABLE 10

| | ExtraInfo | | | | | | | |
|---|---|---|---|---|---|---|---|---|
| Result | Bit 7 | Bit 6 | Bit 5 | Bit 4 | Bit 3 | Bit 2 | Bit 1 | Bit 0 |
| ERR_ROUTE | | | | Not Used | | | | |
| CONNECT | | | | ShortAddress | | | | |
| ERR_CONNECT | | | | Not Used | | | | |
| MSG_CONFIRM | | | 0x00 | | | | | AppSeqNr |
| RTE_MAXADDRESS | | | | EstimatedNrHops | | | | |
| EXP_CORRUPTED | | | 0x00 | | MessageID | | | AppSeqNr |

On receipt of the NWK_CONFIRM message, the network layer 6 is notified of the confirmation of a previous message from a peer node. A specific reaction depends upon the context of the received message. If the receiving message buffer is full, then the message is discarded and a debugging exception is raised. If the node determines it is the recipient of the NWK_CONFIRM message, then it takes the following actions: (1) the NC 24 is confirming the acceptance of a node in its PAN-ID; in this case, Result has the value of CONNECT, and ExtraInfo contains the DSR short address assigned to the joining ND; (2) the NC 24 is denying a node in its PAN-ID; in this case, Result has the value of ERR_CONNECT, and ExtraInfo is not used; (3) a peer node sends confirmation of data delivery to a particular address; in this case, Result has the value of MSG_CONFIRM, and ExtraInfo contains the AppSeqNr corresponding to the originating Data Request; (4) a peer node cannot relay a message to a particular address because of a routing error; in this case, Result has the value of ERR_ROUTE, and ExtraInfo contains the reason for the failure; (5) a peer node cannot relay a message to a particular address because a maximum number of addresses was exceeded; in this case, Result has the value of RTE_MAXADDRESS, and ExtraInfo is not used; and (6) a peer node cannot relay a message to a particular address because the message was corrupted; in this case, Result has the value of EXP_CORRUPTED, and ExtraInfo contains the message identifier of the offending message.

If the node determines that it must relay the NWK_CONFIRM message, then it takes the following actions: (1) updates the node's routing table (e.g., 30) and quality metrics, if needed; (2) checks whether the maximum number of hops allowed has been reached; if that is true, then a debugging exception is raised and the message is discarded; (3) retransmits the packet to its best neighbor (as defined by the NC), and modifies only AddrCount and AddrList according to the PSR algorithm; the message is not discarded until a positive acknowledgement from the MAC layer 4 indicates that the message has been relayed successfully to its neighbor; and (4) if all retransmission attempts fail, then the original message is discarded and the network layer 6 sends a NWK_CONFIRM message with Result code of ERR_ROUTE to the originator; however, one exception of this rule is if the original message is already a NWK_CONFIRM message with Result code of ERR_ROUTE.

The message NWK_ROUTE_UPDATE is used by the NC 24 as a mechanism for altering the routing table (e.g., 30 of FIG. 6) of a particular device 14.

Table 11 shows the record definition of the network layer's PAN Information Database (PIB) for LR-WPAN.

The PSR algorithm 12 reduces processing and memory requirements of the NDs 14 since each ND 14 need not include a complete best-route path to all of the other NDs 14. Furthermore, each ND 14 need not include a routing table for downstream communications from the NC 24 back down to the destination ND 14, since a full source route is stored within the NC 24 and is used for all communications from the NC 24 to any ND 14. Instead, the ND routing table 30 only has information related to upstream communications to the NC 24 through "best" neighbor NDs 14. In this manner, a relatively less expensive ND 14 having a relatively small memory may be employed (e.g., having a routing table 30

TABLE 11

| Record | Type | Preconditions | Description |
|---|---|---|---|
| nwkMaxAddress | U8 | $\geq 0$ | The default value for this record is 6. |
| nwkCoordinator | BOOL | | If TRUE, the node is a Network Coordinator, otherwise the node is a Network Device. |
| nwkPower | Enumerated | ∈{MBACKUP, MAINSPWR, BATTERY} | Mains-powered with Backup = MBACKUP<br>Mains-powered = MAINSPWR<br>Battery Powered = BATTERY |
| nwkScanRequestBackOffTime | U8 | | Time to wait (ms) before scanning again during scan requests |
| nwkMaxRTEntries | U16 | | Depends on the RAM Available. |
| nwkMaxAddrWidth | U8 | | |
| nwkMaxNPDUSize | U8 | | maximum size of the NPDU |

In Table 11, the record nwkMaxAddress indicates the maximum number of addresses that the source routing can have in a frame. The maximum size of the Physical Layer PDU (phyMaxPacketSize) and the Address Identifier size (nwkMaxAddrWidth) limits this number. The default value is 6.

The record nwkCoordinator indicates whether the actual transceiver behaves as NC 24 or ND 14. The network layer 6 reads this record when a NLME-INITIALIZE.request primitive is received, in order that any changes to this entry are performed prior to "connecting" the device.

The record nwkpower indicates the source power of the node. The main distinction between a mains-powered node and battery powered node is that the latter node must be deactivated in order to replace the battery. In the context of LR-WPAN, a device like a PDA can be considered "mains-powered", since its power capabilities are "recharged" when needed.

The record nwkMaxRTEntries indicates the maximum size of the routing table entries. This number is selected based on the amount of RAM resources available.

The exemplary Proactive Source Routing (PSR) algorithm 12 allows the creation of simple wireless networking among wireless NDs 14 distributed in a mesh configuration with a network coordinator (NC) 24. The PSR algorithm 12 is hybrid because is a mix between (a) reactive algorithms, which wait for changes in order to update routing tables, and (b) proactive, since it implements a neighbor discovery protocol.

The PSR algorithm 12 provides improvements in optimizing power consumption in wireless transceivers. Accordingly, this is beneficial for a wide range of industrial, commercial and residential applications. Furthermore, the PSR algorithm 12 employs network coordinators (NCs) 24 for overall network supervision, and preferably only mains-powered NDs 14 to relay information from other NDs 14. Hence, the PSR algorithm 12 is applicable to heterogeneous networks with both battery and mains-powered devices.

(FIG. 6) storing, for example, the previous N (e.g., about 5 or more) "best" neighbors employed, or the M (e.g., about 6 or less) "best" neighbors, which satisfy a suitable Quality function 76 (Equation 1).

Examples of the ad-hoc communication network 23 of FIG. 3 are set forth in Examples 1-8, below.

EXAMPLE 1

The industrial market is a natural place for sensor networks. Using a combination of sensors and LR-WPAN devices, data is gathered, processed and analyzed to determine whether or when user interaction is required. Examples of wireless sensor applications include detecting emergency situations, such as hazardous chemical levels and fires, and monitoring and maintenance of rotating machinery. An LR-WPAN significantly reduces the installation cost of new sensor networks and simplifies expansion of existing network installations. Applications include monitoring applications with noncritical data where longer latencies are acceptable. Such industrial monitoring applications, in general, do not need high data throughput or constant updating. Instead, emphasis is placed on low power consumption in order to maximize the lifetime of the battery-powered devices that make up the network.

EXAMPLE 2

Wireless communication may also be applied to vehicles, such as cars, as driver comfort and the number of features increase. In a similar manner, the number of wires required in a car has grown significantly, having a great impact on installation cost. In contrast to the home or office environment, the automotive environment represents a relatively underdeveloped application field regarding the provision of new services or updating existing services. One of the key factors missing for accomplishing this task is an appropriate wireless delivery medium based on standard specifications. The wireless option introduces flexibility in installation and an advanced alternative to wired connections. A special challenge for automotive applications is meeting the harsh automotive environment with a solution low enough in cost to find volume applications. Some of the applications WPANs can address in a vehicle are control and monitoring of noncritical sensors.

EXAMPLE 3

One vehicle application example is a tire pressure monitoring system. The system consists of four pressure sensors (i.e., NDs), one mounted on each tire, and a central control unit or station (i.e., NC) to receive the collected data. Since the pressure sensors have to be mounted on the tires, this application does not permit the use of any communication wires or power cables. Therefore, sensors have to be battery-powered. Since it is impractical to replace the sensors or their batteries between tire changes, it is required that the sensor batteries last at least three, preferably up to five, years. This puts significant constraints on the power consumption of the electronic components and requires power management capabilities. The data that needs to be communicated is, in most cases, only a few bits in size and indicates the measured tire pressure. This information is transmitted about every 1 to 10 minutes under non-alarm conditions. Unless there is a fast loss of pressure, the message latency is not of significant concern. In case of sudden pressure loss, the central station should be notified immediately, in which case power consumption is not of concern since most likely the tire has to be replaced. Extreme automotive environmental conditions and the metallic structure hinder RF propagation. In addition, the shape of the tire rim has a significant impact on the radiation pattern from the wireless sensor. To overcome this issue, repeater NDs (i.e., other NDs), which will not add significant cost to the system, can be added to the network to increase communications reliability.

EXAMPLE 4

Another challenging application for LR-WPANs is precision farming, also called precision agriculture. Precision agriculture is an environment-friendly system solution that optimizes product quality and quantity while minimizing cost, human intervention, and variation caused by unpredictable nature. With the new paradigm of precision agriculture, farming would become more information-oriented and software-oriented, using automatic and remote-controlled networked smart machines. This application employs large mesh-type networks consisting of potentially thousands of LR-WPAN devices linked with sensors. These sensors gather field information, such as soil moisture content, nitrogen concentration, and pH level. Weather sensors for measuring rainfall, temperature, humidity, and barometric pressure also provide the farmer with valuable information. Each sensor passes the measured data to its corresponding LR-WPAN device (i.e., ND), which in turn passes it through the network to a central collection device (i.e., NC). In order for the sensor data to be useful, location awareness technology is necessary for correlating each sensor with its specific location in the field.

The precision agriculture application is at the low end of the LR-WPAN application range, requiring the transmission of only a few bits of data per day by each deployed device. The data flow will be asynchronous in nature, with minimal restrictions on data latency. This combination of factors is advantageous for achieving long battery life. The challenge of this application is the topology of the network, since the application requires a mesh topology: some NDs serve as repeaters for others, relaying messages to the final destination, while still being power-conscious to obtain the required usage life. The network should also be self-configuring since manual setup of a network of the proposed size is not feasible.

EXAMPLE 5

The consumer and home automation market presents significant potential because of its size. LR-WPAN devices replace wires in consumer electronics at relatively very low cost due to the reduced capability set (e.g., a relatively lower data rate) while still enhancing everyone's life and entertainment experience. Types of potentially networked devices include televisions, VCRs, PC peripherals, and interactive toys and games, and the applications may include monitoring and control of the home's security system, lighting, air conditioning system and appliances. Most of these devices have an industry group interested in using a low-cost, low-data-rate wireless solution. The potential for such networked devices within the home may be as high as about 100 to about 150 devices, and is well suited to a star topology.

EXAMPLE 6

A unique application scenario, falling within the consumer market, is a classroom calculator network. This network operates in a master-slave mode in a star topology. The teacher workstation, the network master (i.e., NC), sends tasks and math problems to each of the student's graphic calculators, the network slaves (i.e., NDs). After completion, the students upload their solutions back to the teacher workstation. This network needs to support only a relatively small number of NDs, typically about 30, and requires disallowing any peer-to-peer communication to prevent students from exchanging the solutions. The typical payload is about 100 to 500 bytes of information, sent several times per student per hour. It is desired that the batteries to power the calculator and communication function last the duration of a semester. While this is definitely a more throughput-consuming application than those presented so far, it is well suited to an LR-WPAN.

EXAMPLE 7

IEEE 802.15.4 is designed to be useful in a wide variety of applications, including industrial control and monitoring; public safety, including sensing and location determination at disaster sites; automotive sensing, such as tire pressure monitoring; smart badges and tags; and precision agriculture, such as sensing of soil moisture, pesticide, herbicide and pH levels. However, one of the largest application opportunities for IEEE 802.15.4 is home automation and networking.

EXAMPLE 8

Inside the home, one may consider several possible market sectors: PC peripherals, including wireless mice, keyboards, joysticks, low-end PDAs, and games; consumer electronics, including radios, televisions, VCRs, CDs, DVDs, remote controls, and a truly universal remote control to control them; home automation, including heating, ventilation, and air conditioning (HVAC), security, lighting, and the control of objects such as curtains, windows, doors, and locks; health monitoring, including sensors, monitors, and diagnostics; and toys and games, including PC-enhanced toys and interactive gaming between individuals and groups. The maximum required data rate for these applications is expected to range from about 115.2 kb/s for some PC peripherals to less than about 10 kb/s for some home automation and consumer electronics applications. Similarly, maximum acceptable message latency is expected to range from approximately 15 ms for PC peripherals to about 100 ms or more for home automation applications.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An ad-hoc network comprising:
   an ad-hoc network coordinator comprising:
     a first processor,
     a first memory,
     a first communication interface;
   a plurality of ad-hoc network devices, each of said ad-hoc network devices comprising:
     a second processor,
     a second memory,
     a second communication interface for communication with the first communication interface of said ad-hoc network coordinator or with the second communication interface of another one of said ad-hoc network devices,
   wherein said first memory stores for at least some of said ad-hoc network devices a complete communication route for messages from said ad-hoc network coordinator through at least one of said ad-hoc network devices to a corresponding one of said at least some of said ad-hoc network devices,
   wherein said second memory of each of said ad-hoc network devices stores an identification of another one of said ad-hoc network devices to forward a message from the second communication interface of a corresponding one of said ad-hoc network devices toward the first communication interface of said ad-hoc network coordinator and through the second communication interface of said another one of said ad-hoc network devices;
   wherein said second processor includes means for providing said identification of another one of said ad-hoc network devices to forward a message based upon quality information associated with communications between said second communication interface of said corresponding one of said ad-hoc network devices and said second communication interface of said another one of said ad-hoc network devices; and
   wherein said quality information is positively correlated with a quality value associated with a communication link between said second communication interface of said corresponding one of said ad-hoc network devices and said second communication interface of said another one of said ad-hoc network devices, and is negatively correlated with a count of hops from said second communication interface of said another one of said ad-hoc network devices to said ad-hoc network coordinator.

2. A method of routing communications in an ad-hoc network, said method comprising:
   employing an ad-hoc network coordinator including a first communication interface;
   employing a plurality of ad-hoc network devices;
   employing with each of said ad-hoc network devices a second communication interface for communication with the first communication interface of said ad-hoc network coordinator or with the second communication interface of another one of said ad-hoc network devices;
   storing a plurality of complete communication routes for at least some of said ad-hoc network devices for messages from said ad-hoc network coordinator through at least one of said ad-hoc network devices to a corresponding one of said at least some of said ad-hoc network devices;
   for each of said ad-hoc network devices, storing an identification of another one of said ad-hoc network devices to forward a message from the second communication interface of a corresponding one of said ad-hoc network devices toward the first communication interface of said ad-hoc network coordinator and through the second communication interface of said another one of said ad-hoc network devices;
   employing routing information with each of said ad-hoc network devices to forward said message from said corresponding one of said ad-hoc network devices to said ad-hoc network coordinator; and
   including with said routing information at least one entry comprising a network address of another one of said ad-hoc network devices other than said corresponding one of said ad-hoc network devices, a quality value corresponding to a communication link between said corresponding one of said ad-hoc network devices and said another one of said ad-hoc network devices, a count of hops from said corresponding one of said ad-hoc network devices through said another one of said ad-hoc network devices toward said ad-hoc network coordinator, and an indication whether said another one of said ad-hoc network devices is mains-powered.

3. The method of claim 2 further comprising
   employing as said another one of said ad-hoc network devices a mains-powered ad-hoc network device having a rechargeable power capability.

4. The method of claim 2 further comprising
   for each of at least some of said another one of said ad-hoc network devices, determining a quality function based upon said routing information; and
   determining a maximum value of said quality function and responsively starting a communication route for said message from said corresponding one of said ad-hoc network devices toward said ad-hoc network coordinator and through the corresponding one of said at least some of said another one of said ad-hoc network devices having said maximum value.

5. The method of claim 2 further comprising
   updating said routing information based upon changes in said ad-hoc network.

6. The method of claim 2 further comprising
   employing as said message a first message;

receiving a second message from one of said ad-hoc network devices at said corresponding one of said ad-hoc network devices;
determining that said second message was acknowledged; and
increasing the quality value for said one of said ad-hoc network devices.

7. The method of claim 6 further comprising
employing said quality value having a predetermined maximum value.

8. The method of claim 2 further comprising
employing as said message a first message;
receiving a second message from one of said ad-hoc network devices at said corresponding one of said ad-hoc network devices;
determining that said second message was not acknowledged; and
decreasing the quality value for said one of said ad-hoc network devices.

9. A method of routing communications in an ad-hoc network, said method comprising:
employing an ad-hoc network coordinator including a first communication interface;
employing a plurality of ad-hoc network devices;
employing with each of said ad-hoc network devices a second communication interface for communication with the first communication interface of said ad-hoc network coordinator or with the second communication interface of another one of said ad-hoc network devices;
storing a plurality of complete communication routes for at least some of said ad-hoc network devices for messages from said ad-hoc network coordinator through at least one of said ad-hoc network devices to a corresponding one of said at least some of said ad-hoc network devices;
for each of said ad-hoc network devices, storing an identification of another one of said ad-hoc network devices to forward a message from the second communication interface of a corresponding one of said ad-hoc network devices toward the first communication interface of said ad-hoc network coordinator and through the second communication interface of said another one of said ad-hoc network devices;
broadcasting a plurality of request messages from said corresponding one of said ad-hoc network devices to at least some of other ones of said ad-hoc network devices;
employing routing information with each of said ad-hoc network devices to forward said message from said corresponding one of said ad-hoc network devices toward said ad-hoc network coordinator;
including with said muting information at least one entry comprising a count of hops from said corresponding one of said ad-hoc network devices through at least one of said ad-hoc network devices toward said ad-hoc network coordinator, and an indication whether said at least one of said ad-hoc network devices has a communication route to said ad-hoc network coordinator and is mains-powered;
receiving a response message from one of said ad-hoc network devices;
entering an entry for said one of said ad-hoc network devices in said routing information;
obtaining said indication and said count of hops from said response message; and
entering said indication and said count of hops in said routing information for said entry for said one of said ad-hoc network devices.

10. A method of routing communications in an ad-hoc network, said method comprising:
employing an ad-hoc network coordinator including a first communication interface;
employing a plurality of ad-hoc network devices;
employing with each of said ad-hoc network devices a second communication interface for communication with the first communication interface of said ad-hoc network coordinator or with the second communication interface of another one of said ad-hoc network devices;
storing a plurality of complete communication routes for at least some of said ad-hoc network devices for messages from said ad-hoc network coordinator through at least one of said ad-hoc network devices to a corresponding one of said at least some of said ad-hoc network devices;
for each of said ad-hoc network devices, storing an identification of another one of said ad-hoc network devices to forward a message from the second communication interface of a corresponding one of said ad-hoc network devices toward the first communication interface of said ad-hoc network coordinator and through the second communication interface of said another one of said ad-hoc network devices;
employing as said message a first message;
employing a first ad-hoc network device as said corresponding one of said ad-hoc network devices;
employing a second ad-hoc network device as another one of said ad-hoc network devices;
employing routing information with said first ad-hoc network device to forward said first message from said first ad-hoc network device toward said ad-hoc network coordinator,
including with said routing information at least one entry comprising a count of hops from said first ad-hoc network device through at least one different one of said ad-hoc network devices toward said ad-hoc network coordinator, and an indication whether said different one of said ad-hoc network devices is mains-powered;
receiving a second message from said second ad-hoc network device; and
entering an winy for said second ad-hoc network device in said routing information.

11. The method of claim 10 further comprising
obtaining said indication from said second message;
entering said indication in said entry for said second ad-hoc network device in said routing information; and
setting said count of hops in said entry for said second ad-hoc network device in said routing information to a predetermined count.

* * * * *

UNITED STATES PATENT AND TRADEMARK OFFICE
CERTIFICATE OF CORRECTION

PATENT NO. : 7,349,360 B2
APPLICATION NO. : 10/441315
DATED : March 25, 2008
INVENTOR(S) : Jose A. Gutierrez et al.

It is certified that error appears in the above-identified patent and that said Letters Patent is hereby corrected as shown below:

On the Title Page: Item (73) Assignee, "Gaton" should read --Eaton--.

Signed and Sealed this
Fifth Day of March, 2013

Teresa Stanek Rea
*Acting Director of the United States Patent and Trademark Office*